US010532763B2

(12) United States Patent
Yamada et al.

(10) Patent No.: US 10,532,763 B2
(45) Date of Patent: *Jan. 14, 2020

(54) DRIVING SUPPORT DEVICE, DRIVING SUPPORT SYSTEM, AND DRIVING SUPPORT METHOD

(71) Applicant: Panasonic Intellectual Property Management Co., Ltd., Osaka (JP)

(72) Inventors: Kazushige Yamada, Kanagawa (JP); Osamu Yamaji, Hiroshima (JP); Azusa Gojyo, Kanagawa (JP); Satoshi Kajita, Kanagawa (JP); Toshiaki Mori, Kanagawa (JP); Makoto Okada, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 91 days.

This patent is subject to a terminal disclaimer.

(21) Appl. No.: 15/793,762

(22) Filed: Oct. 25, 2017

(65) Prior Publication Data

US 2018/0043923 A1 Feb. 15, 2018

Related U.S. Application Data

(63) Continuation of application No. 15/328,012, filed as application No. PCT/JP2016/003379 on Jul. 19, 2016, now Pat. No. 9,828,020.

(30) Foreign Application Priority Data

Jul. 31, 2015 (JP) .................................. 2015-152847

(51) Int. Cl.
*B62D 1/22* (2006.01)
*B60W 50/10* (2012.01)
(Continued)

(52) U.S. Cl.
CPC ................ *B62D 1/22* (2013.01); *B60K 37/06* (2013.01); *B62D 15/02* (2013.01); *G06F 3/0486* (2013.01);
(Continued)

(58) Field of Classification Search
CPC ...... B62D 1/22; B62D 15/02; B62D 15/0255; B62D 15/026; B60K 35/00; B60W 50/10;
(Continued)

(56) References Cited

U.S. PATENT DOCUMENTS 8,983,679 B2 * 3/2015 Kitahama .............. G01C 21/34
701/1
9,227,568 B1 * 1/2016 Hubbell .................. B60R 1/081
(Continued)

FOREIGN PATENT DOCUMENTS

JP 10-105885 A 4/1998
JP 10-222279 A 8/1998
(Continued)

OTHER PUBLICATIONS

International Search Report of PCT application No. PCT/JP2016/003379 dated Sep. 13, 2016.

*Primary Examiner* — Behrang Badii
*Assistant Examiner* — Daniel L Greene
(74) *Attorney, Agent, or Firm* — Seed IP Law Group LLP

(57) ABSTRACT

In a driving support device, an image output unit outputs an image including a vehicle object representing a vehicle and a peripheral situation of the vehicle, to a display unit. An operation signal input unit receives a gesture operation by a user that involves moving of the vehicle object in the image displayed on the display unit. A command output unit outputs a command according to the gesture operation, to an automatic driving control unit that controls automatic driving.

18 Claims, 36 Drawing Sheets

(a) (b) (c)

(51) Int. Cl.
  *B60W 50/14* (2012.01)
  *B60K 37/06* (2006.01)
  *B62D 15/02* (2006.01)
  *G06F 3/0481* (2013.01)
  *G06F 3/0486* (2013.01)
  *G06F 3/0488* (2013.01)
  *B60K 35/00* (2006.01)
  *G08G 1/16* (2006.01)
  *G06F 3/01* (2006.01)

(52) U.S. Cl.
  CPC ...... *G06F 3/04817* (2013.01); *G06F 3/04883* (2013.01); *B60K 2370/11* (2019.05); *B60K 2370/143* (2019.05); *B60K 2370/193* (2019.05); *G06F 2203/04808* (2013.01)

(58) Field of Classification Search
  CPC . G06F 3/04817; G06F 3/0486; G06F 3/04883
  See application file for complete search history.

(56) References Cited

U.S. PATENT DOCUMENTS

| | | | |
|---|---|---|---|
| 9,513,702 B2* | 12/2016 | Cho | G06F 3/013 |
| 9,623,874 B2 | 4/2017 | Baek et al. | |
| 9,845,010 B2* | 12/2017 | Suzuki | B60K 35/00 |
| 2011/0022393 A1* | 1/2011 | Waller | G01C 21/3608 704/270 |
| 2012/0069131 A1* | 3/2012 | Abelow | G06Q 10/067 348/14.01 |
| 2012/0288138 A1* | 11/2012 | Zeng | G08G 1/09623 382/103 |
| 2014/0176350 A1* | 6/2014 | Niehsen | B62D 15/025 340/988 |
| 2014/0309864 A1* | 10/2014 | Ricci | H04W 4/21 701/36 |
| 2014/0309888 A1* | 10/2014 | Smit | B62D 13/06 701/41 |
| 2015/0032321 A1* | 1/2015 | Wimmer | B60W 50/082 701/23 |
| 2016/0101785 A1 | 4/2016 | Takahashi et al. | |

FOREIGN PATENT DOCUMENTS

| | | |
|---|---|---|
| JP | 2005-041433 A | 2/2005 |
| JP | 2010-198578 A | 9/2010 |
| JP | 2013-083520 A | 5/2013 |
| JP | 2015-011458 A | 1/2015 |

* cited by examiner

FIG. 6

| | Contact start position | | Contact end position | | | | | |
|---|---|---|---|---|---|---|---|---|
| | Host vehicle | Nearby vehicle | Emergency vehicle | Pedestrian | Traffic lane | Road shoulder | inters-ection | Specific area |
| Drag and drop | --- | Following/line | a. Left-aligned temporary stop (in a case where emergency vehicle is positioned at right side of host vehicle) d. Right-aligned temporary stop (in a case where emergency vehicle is positioned at left side of host vehicle) | Stop next to pedestrian | a. Traffic lane change (in a case where host vehicle is not in the vicinity of intersection) b. Right turn and left turn (in a case where host vehicle is in the vicinity of intersection) | Parking at road shoulder | Right turn and left turn | a. Temporary retreat b. Route change c. Passing spot addition |
| Flick /swipe | a. Vehicle speed b. Inter-vehicle distance c. Traffic lane change (in a case where there is another traffic lane) d. Right turn and left turn (in a case where host vehicle is in the vicinity of intersection) | --- | --- | --- | --- | --- | --- | --- |
| Pinch in/pinch out | Vehicle speed | a. Inter-vehicle distance (in a case where host vehicle and nearby vehicle are in following traveling) b. Temporary inter-vehicle distance (in a case where host vehicle and nearby vehicle are not in following traveling) | --- | --- | --- | --- | --- | --- |
| Rotation | a. Right turn and left turn (in a case where host vehicle is in the vicinity of intersection) b. Direction change (in a case where host vehicle is in parking space) | a. Vehicle interchange (in a case where host vehicle and nearby vehicle are in following traveling/line traveling) b. Passing (in a case where host vehicle and nearby vehicle are not in following traveling/line traveling) | --- | --- | --- | --- | --- | --- |

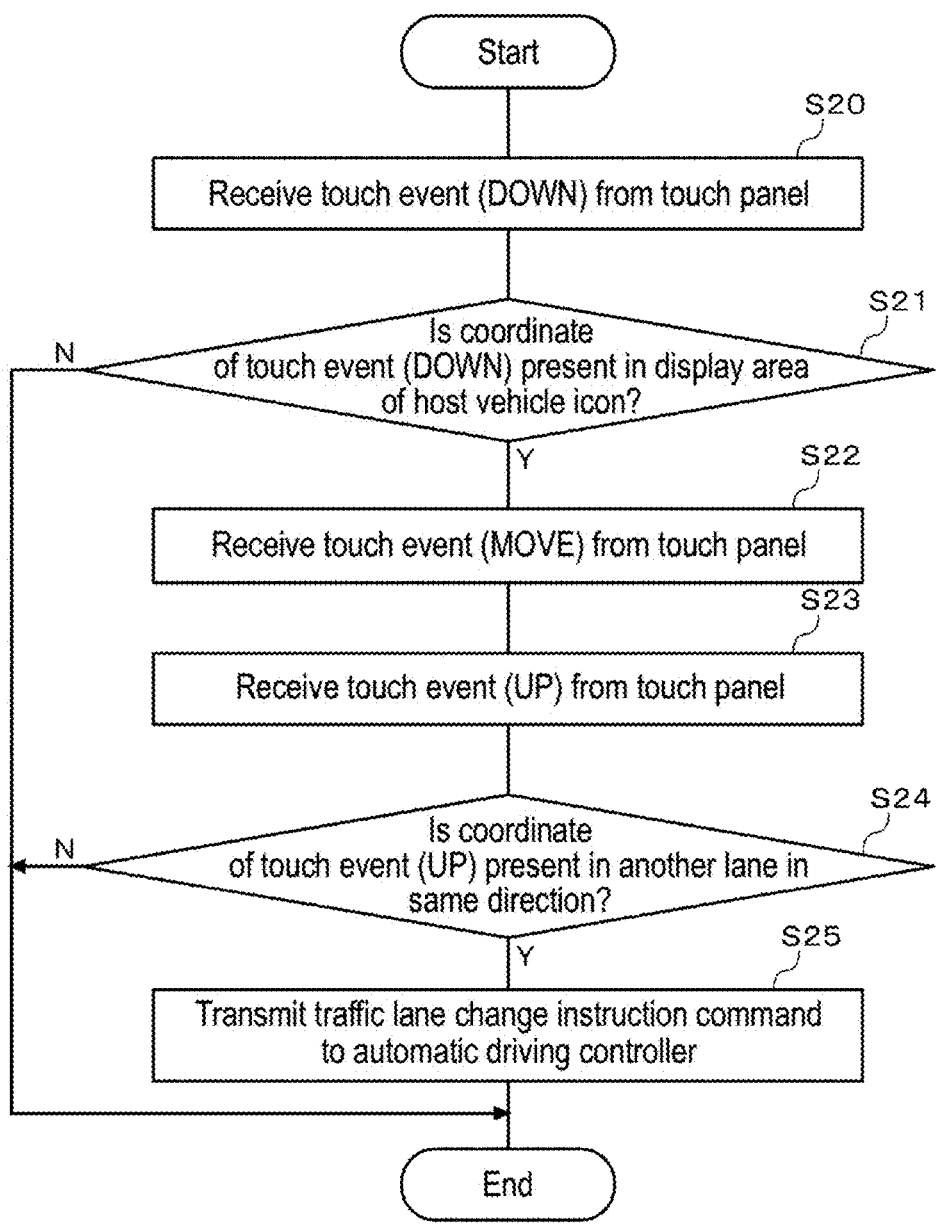

(a)  (b)

(a)  (b)

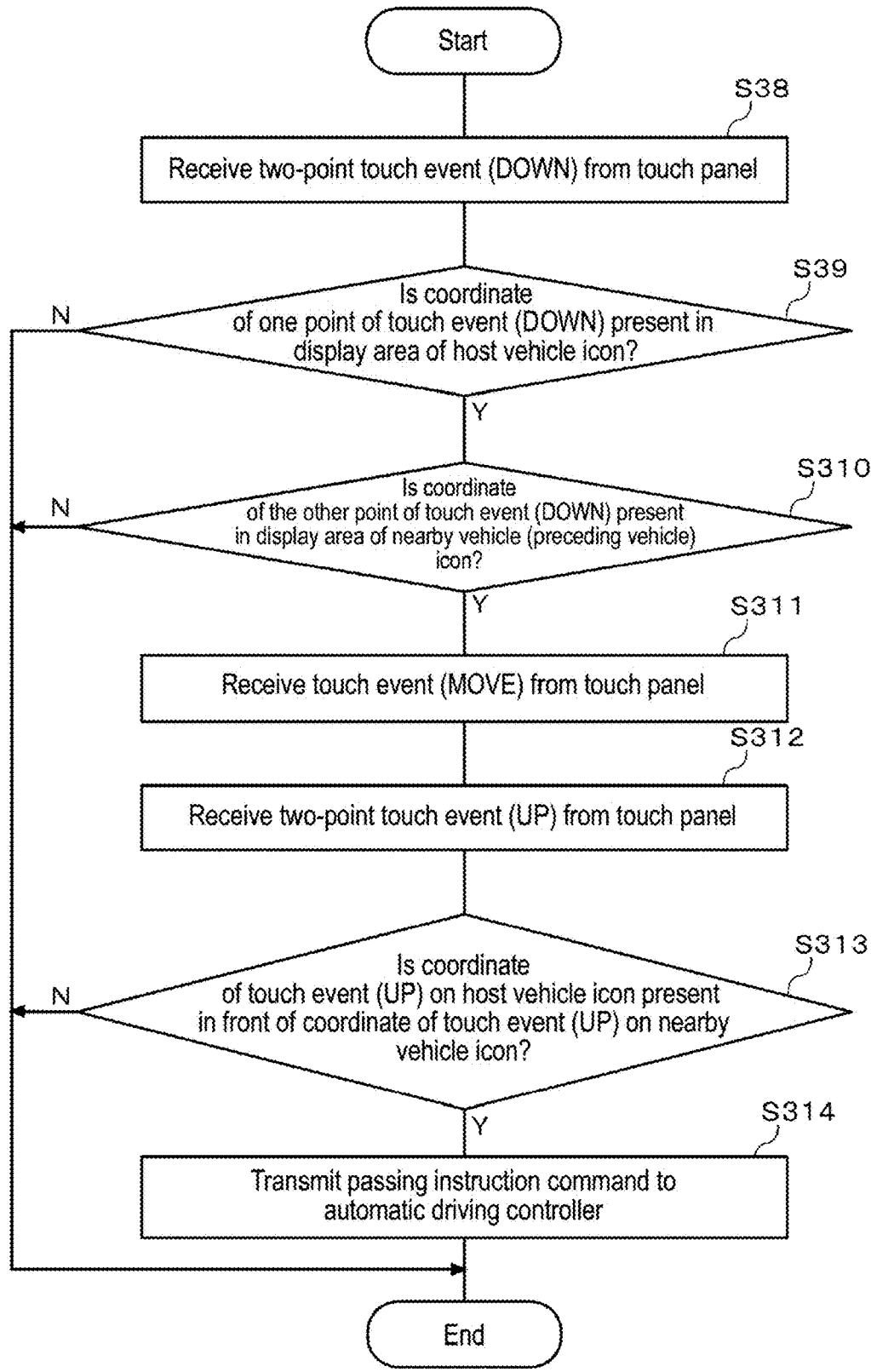

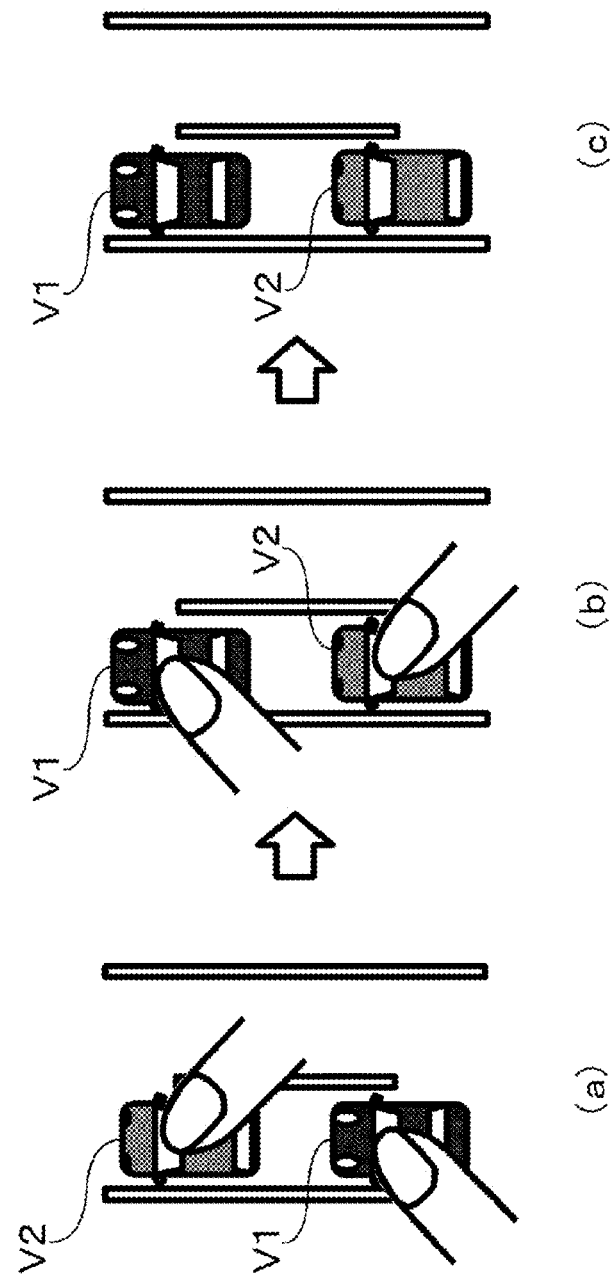

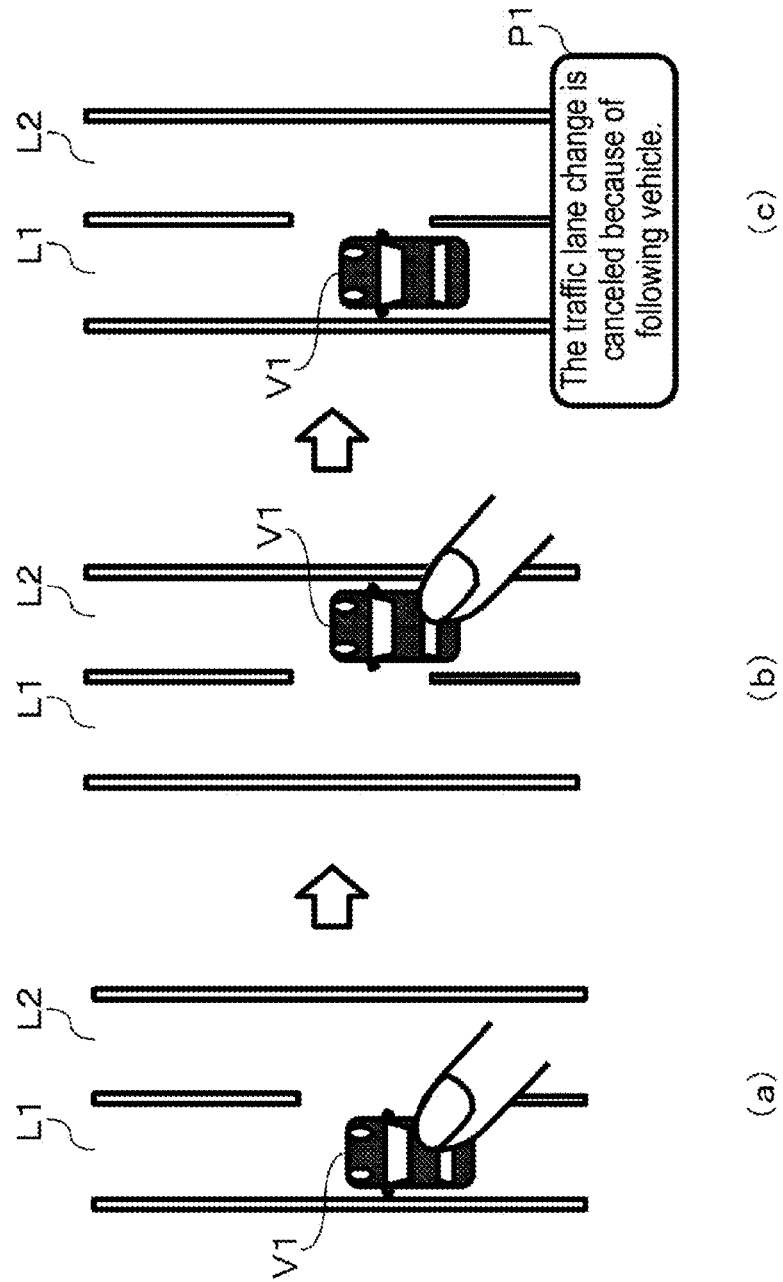

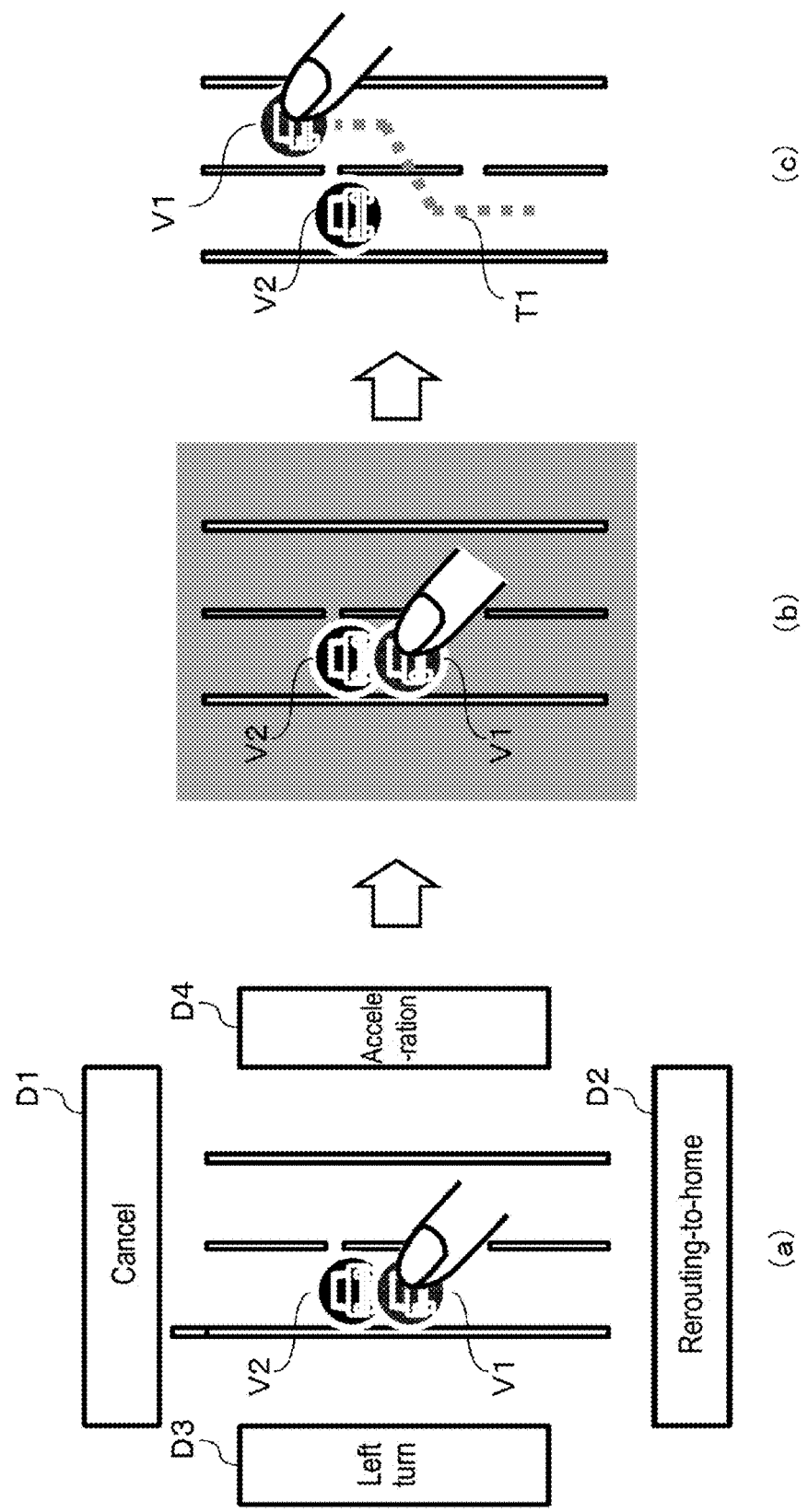

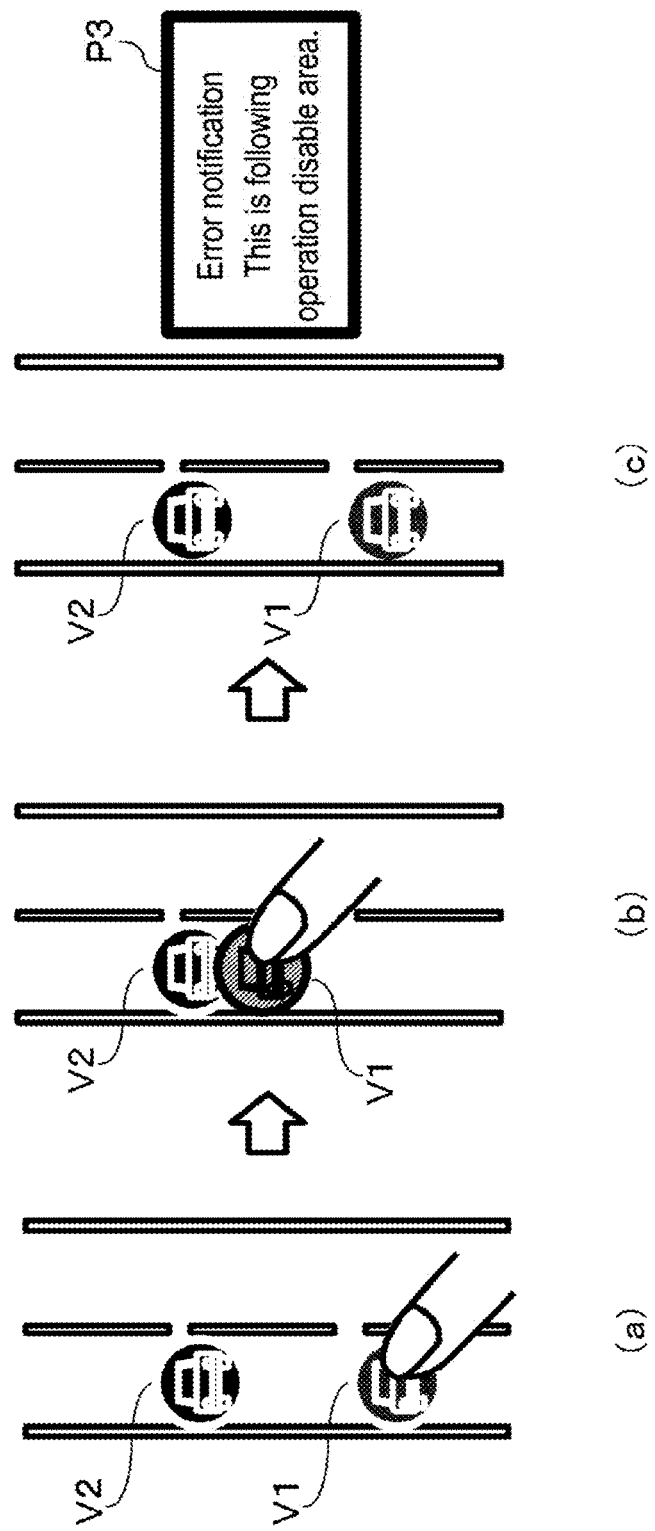

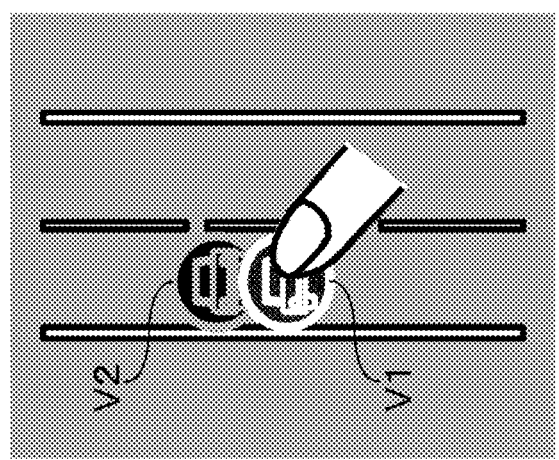
FIG. 30A
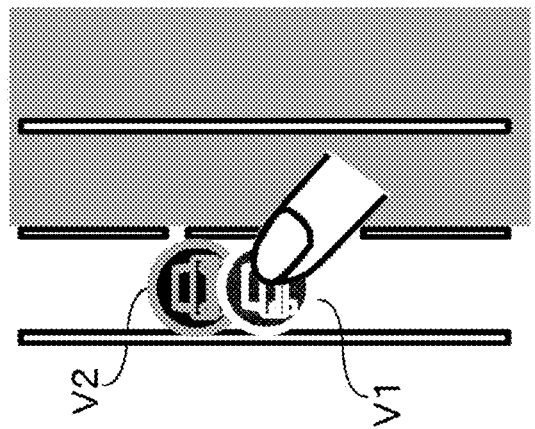
FIG. 30B
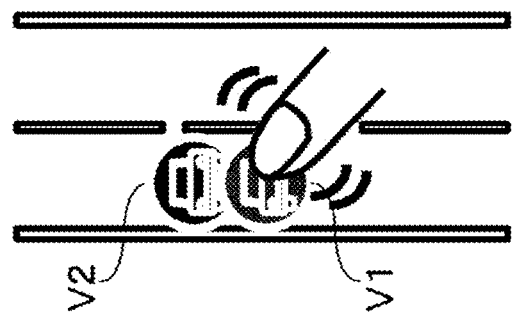
FIG. 30C

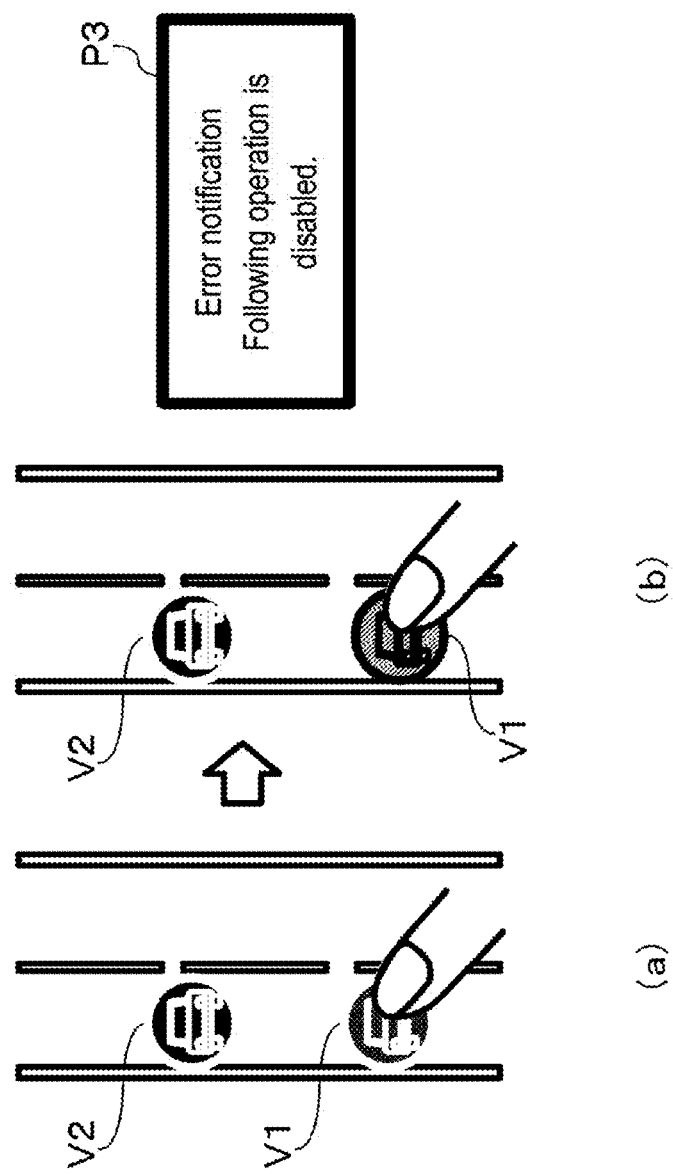

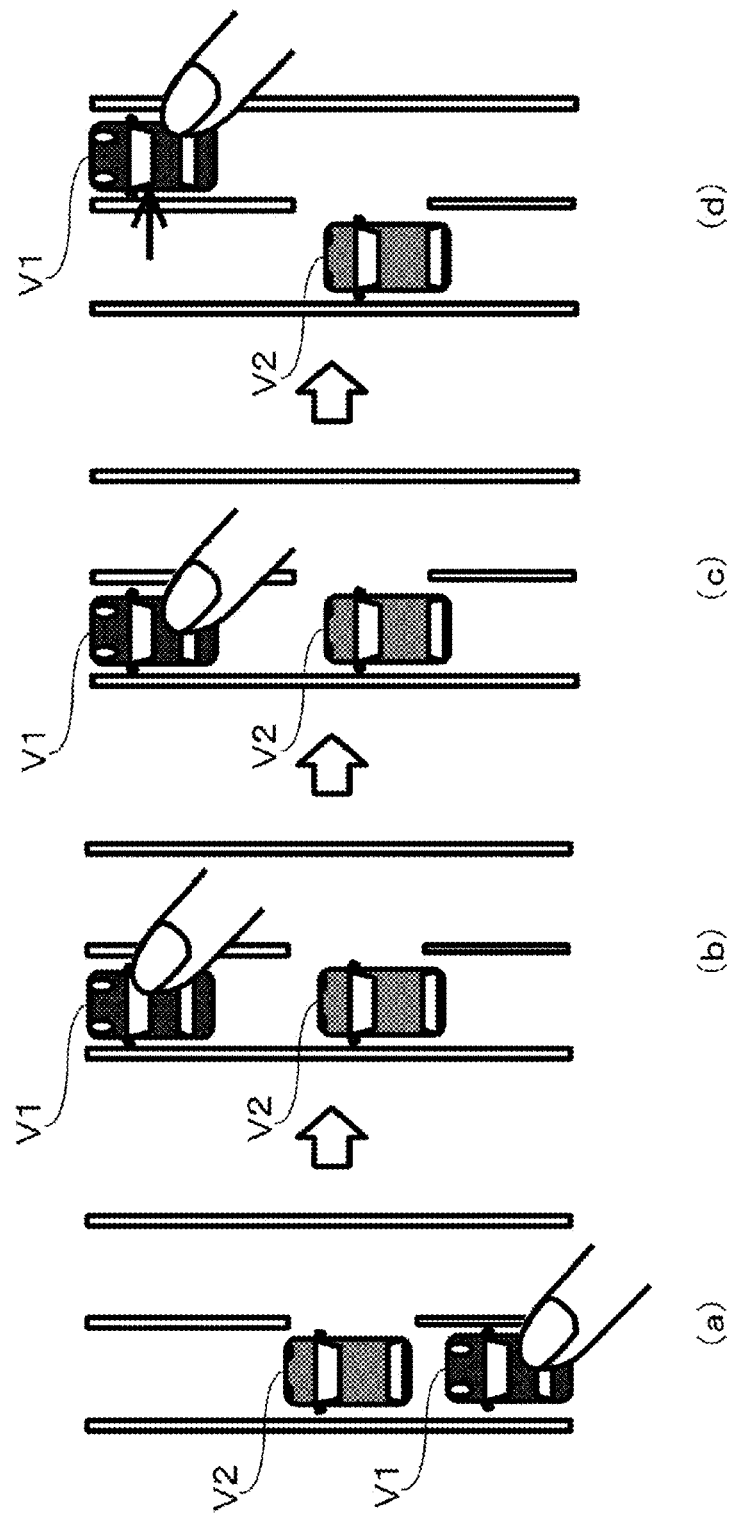

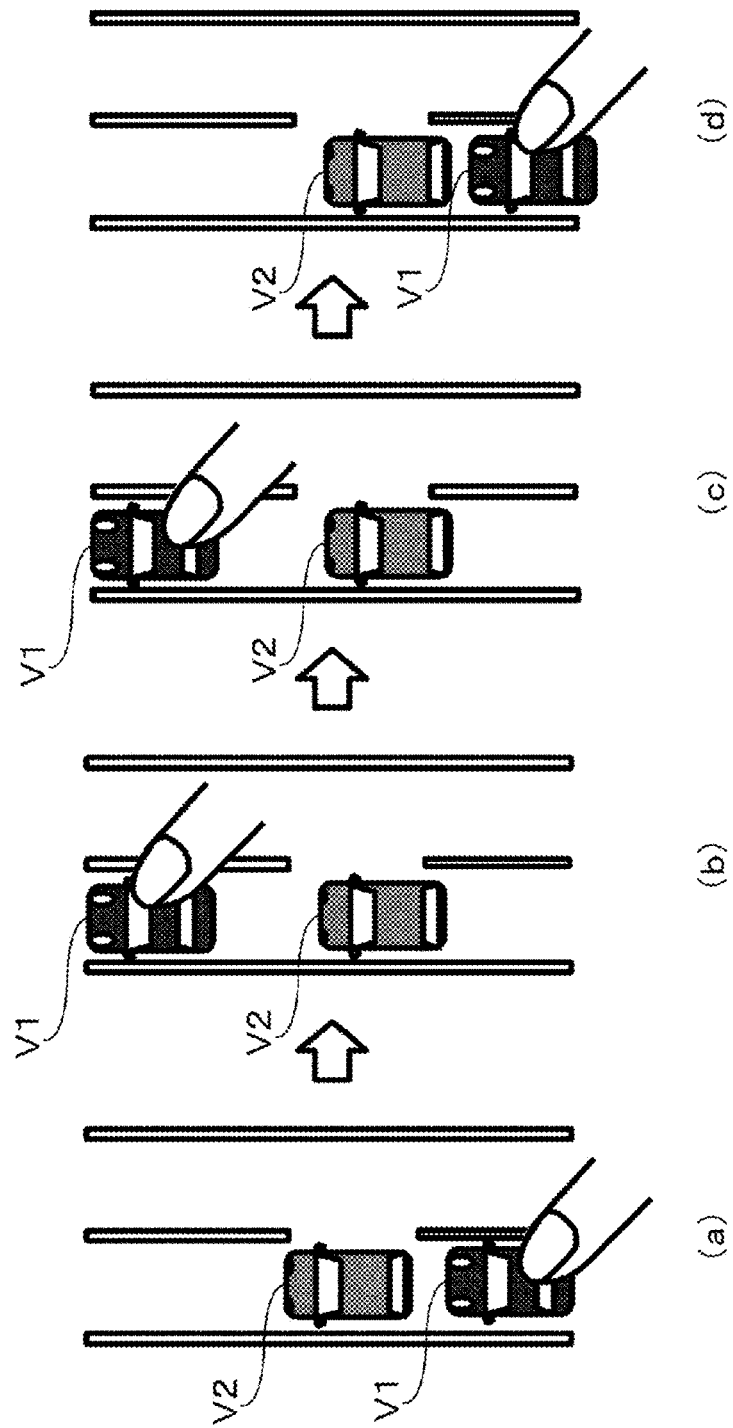

DRIVING SUPPORT DEVICE, DRIVING SUPPORT SYSTEM, AND DRIVING SUPPORT METHOD

TECHNICAL FIELD

The present invention relates to a technique that supports a driving operation instruction of a driver to a vehicle during automatic driving.

BACKGROUND ART

In recent years, developments in automatic driving have progressed. For automatic driving, autonomy levels defined in 2013 by the National Highway Traffic Safety Administration (NHTSA) are classified as no autonomy (level 0), specific-function autonomy (level 1), complex-function autonomy (level 2), semi-automatic driving (level 3), and full-automatic driving (level 4). Level 1 is a driving support system that automatically performs one of acceleration, deceleration, and steering, and level 2 is a driving support system that automatically performs two or more of acceleration, deceleration, and steering in coordination. In all cases, a driver is required to be involved in a driving operation. Autonomy level 4 is a fully-automatic driving system that automatically performs all of acceleration, deceleration, and steering, and thus a driver is not involved in a driving operation. Autonomy level 3 is a semi-fully-automatic driving system that automatically performs all of acceleration, deceleration, and steering, but if necessary, a driving operation is performed by a driver.

As a form of automatic driving, a form in which a driver does not operate an existing driving operation unit such as a steering, an accelerator pedal, or the like but instructs a specific driving operation such as traffic lane change, passing, following traveling, or the like to a vehicle by issuing a command to a vehicle is considered. In this form, a user interface in which there are fewer erroneous operations is required.

CITATION LIST

Patent Literature

PTL 1: Japanese Patent Unexamined Publication No. 10-105885

SUMMARY OF THE INVENTION

An object of the present invention is to provide a technique that allows a driver to intuitively and conveniently instruct a specific driving operation to a vehicle.

In order to solve the above-described problems, a driving support device according to an aspect of the present invention includes an image output unit, an operation signal input unit, and a command output unit. The image output unit outputs an image including a host vehicle object representing a host vehicle and a peripheral situation of the host vehicle, to a display unit. The operation signal input unit receives a gesture operation for moving, in the image displayed on the display unit, the host vehicle object to a position of a non-host vehicle object representing a predetermined target other than the host vehicle. The command output unit outputs, to an automatic driving control unit that controls automatic driving a command for instructing a change of a relative positional relationship between the host vehicle and the predetermined target, or a command for instructing an output of a notice from the host vehicle to the predetermined target.

As another aspect of the present invention, an aspect in which the present invention is converted into a device, a system, a method, a program, a recording medium in which a program is recorded, and a vehicle equipped therewith by arbitrarily combining the above components is also effective.

According to the present invention, a driver can intuitively and conveniently instruct a specific driving operation to a vehicle.

BRIEF DESCRIPTION OF DRAWINGS

FIG. 6 is a diagram illustrating an example of an automatic driving control command table.

FIG. 7 is a flowchart illustrating an example of a gesture operation that drags and drops a host vehicle icon to another lane.

FIG. 11 is a flowchart illustrating an example of a gesture operation that touches two points on a host vehicle icon and a nearby vehicle icon and rotates the two points.

FIG. 12 is a diagram illustrating an example of a gesture operation according to the flowchart of FIG. 11.

FIG. 26 is a diagram illustrating an example of an error display screen.

FIG. 28 is a diagram illustrating another display example during a period for which a host vehicle icon is dragged and dropped onto a nearby vehicle icon.

FIG. 29 is a diagram illustrating a display example of a host vehicle icon being dragged in a case where there is a drop disable area or the like.

FIG. 30A is a diagram illustrating another display example of a host vehicle icon being dragged in a case where there is a drop disable area or the like.

FIG. 30B is a diagram illustrating another display example of a host vehicle icon being dragged in a case where there is a drop disable area or the like.

FIG. 30C is a diagram illustrating another display example of a host vehicle icon being dragged in a case where there is a drop disable area or the like.

FIG. 31 is a diagram illustrating a display example in a case where a drag operation is disabled.

FIG. 35 is a diagram illustrating a third display example of a control being performed while the host vehicle icon is dropped and the host vehicle completes passing.

FIG. 36 is a diagram illustrating a fourth display example of a control being performed while the host vehicle icon is dropped and the host vehicle completes passing.

DESCRIPTION OF EMBODIMENTS

Prior to the description of an exemplary embodiment of the present invention, problems in an apparatus of the related art are briefly described. In only displaying road conditions, when a driver instructs a specific driving operation to a vehicle, the driver needs to operate each specific switch one by one, turn a steering wheel, or depress an accelerator pedal while checking the road conditions. In addition, the sight line of the driver moves. Therefore, there is a possibility of an erroneous operation. Further, In a design in which each switch is designed for a specific driving operation such as traffic lane change, passing, following traveling, or the like, since the correspondence between a switch operation and automatic traveling control is not intuitive, selecting an instruction among many switches, or selecting a changed function with reduced switches according to a situation is a complex task. Thus, there is a problem in that a wide range of users including a person who has not been driving up to now, a person who wants to continue to drive even though the driving capability of the person has been reduced, or the like, cannot use an automatic driving vehicle without training.

Figure 1:
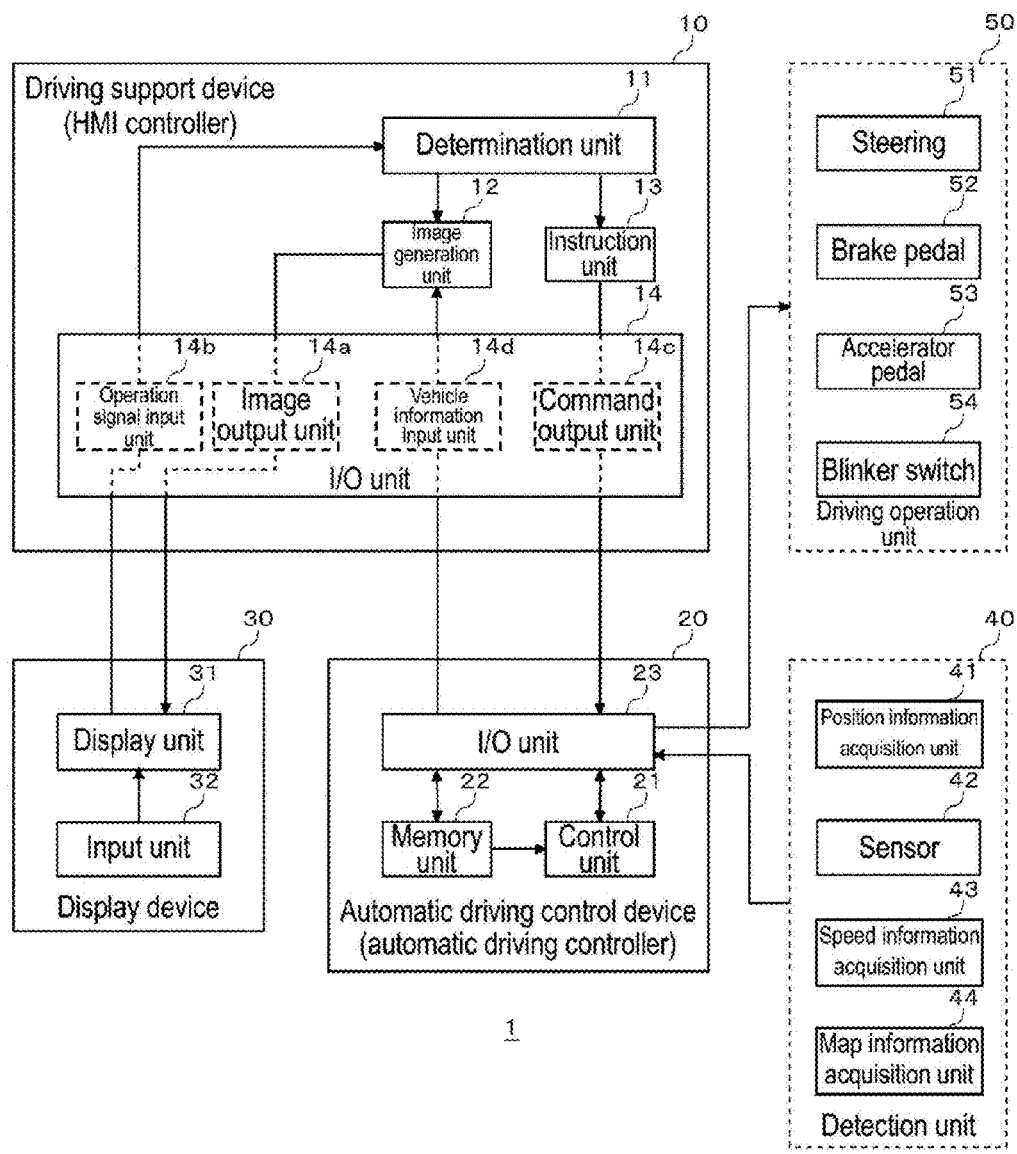
FIG. 1 is a block diagram illustrating a configuration of a vehicle according to an embodiment of the present invention.

Hereinafter, embodiments of the present invention will be described with reference to the drawings. FIG. 1 is a block diagram illustrating a configuration of vehicle 1 according to an embodiment of the present invention, and illustrates a configuration related to automatic driving. Vehicle 1 (a host vehicle) with an automatic driving mode includes driving support device (human-machine interface (HMI) controller) 10, automatic driving control device (automatic driving controller) 20, display device 30, detection unit 40, and driving operation unit 50.

Display device 30 includes display unit 31 and input unit 32. Display device 30 may be a head unit such as a car navigation system, a display audio, or the like, a portable terminal device such as a smart phone, a tablet, or the like, or a dedicated console terminal device.

Display unit 31 is a liquid crystal display, an organic electro-luminescence (EL) display, or a heads-up display (HUD). Input unit 32 is a user interface that receives an input of a user. Display unit 31 and input unit 32 may be an integrated touch panel display. Such as a proximity touch panel that can detect proximity of a hand on a touch panel or a touch pad or a position of a finger due to a hover operation, one that receives a gesture input at a position apart from a predetermined distance from the display unit may be used. Input unit 32 may have an input device such as a mouse, a stylus pen, a trackball, or the like for assisting the gesture input. A pen that emits visible light or infrared light may also be used.

Display unit 31 and input unit 32 may be physically separated from each other, instead of being an integrated touch panel display. For example, input unit 32 includes a sensor such as a camera or the like, and may be a non-contact type input device that allows a gesture operation input in the air. For example, an operation method that starts to drag with a gesture by pointing a target with a finger and making a thumb finger and an index finger close and shut together, and ends to drag with a gesture by making a thumb finger and an index finger separated from each other, is considered.

Driving support device 10 and display device 30 may be connected to each other by wire communication such as a dedicated line, a controller area network (CAN), or the like, or may be connected to each other by wire communication or wireless communication such as USB, Ethernet (registered trademark), Wi-Fi (registered trademark), Bluetooth (registered trademark), or the like.

Detection unit 40 includes position information acquisition unit 41, sensor 42, speed information acquisition unit 43, and map information acquisition unit 44. Position information acquisition unit 41 acquires a current position of vehicle 1 from a global positioning system (GPS) receiver. Sensor 42 is a general term for various sensors for detecting a situation outside the vehicle and a state of vehicle 1. As a sensor for detecting a situation outside the vehicle, for example, a camera, a millimeter wave radar, LIDAR (laser imaging detection and ranging, a light detection and ranging), a temperature sensor, a pressure sensor, a humidity sensor, an illumination sensor, or the like is mounted. As a situation outside the vehicle, a road situation in which the host vehicle travels or an environmental situation including weather, and a host vehicle peripheral situation such as a traveling position or a traveling state of a nearby vehicle traveling at the periphery of the host vehicle are considered. Any information outside the vehicle that can be detected by the sensor may be considered. As a sensor for detecting a state of vehicle 1, for example, an acceleration sensor, a gyro sensor, a geomagnetic sensor, an inclination sensor, or the like is mounted. Speed information acquisition unit 43 acquires the current speed of vehicle 1 from a vehicle speed sensor. Map information acquiring unit 44 acquires map information around the current position of vehicle 1 from a map database. Map database may be recorded on a recording medium in vehicle 1, or may be downloaded from a map server via a network in use.

Detection unit 40 and automatic driving control device 20 are connected to each other by wire communication such as a dedicated line, a USB, an Ethernet (registered trademark), a controller area network (CAN), or the like. A configuration in which data acquired and detected by detection unit 40 is directly output from detection unit 40 to driving support device 10 may be employed.

Driving operation unit 50 includes steering 51, brake pedal 52, accelerator pedal 53, and blinker switch 54. In an automatic driving mode according to the present embodiment, acceleration, deceleration, steering, and blinker blink are a target of automatic control by automatic driving control device 20. In FIG. 1, an operation unit when these controls are performed manually is drawn. Information indicating that driving operation unit 50 is slightly moved by a driver in a manual way may output to driving support device 10.

Steering 51 is an operation unit for steering the vehicle. When steering 51 is rotated by a driver, the traveling direction of the vehicle is controlled through a steering actuator. The steering actuator can be electronically controlled by a steering electronic control unit (ECU).

Brake pedal 52 is an operation unit for decelerating vehicle 1. When brake pedal 52 is depressed by a driver, the vehicle is decelerated via a brake actuator. The brake actuator can be electronically controlled by a brake ECU.

Accelerator pedal 53 is an operation unit for accelerating vehicle 1. When accelerator pedal 53 is depressed by a driver, an engine rotation speed and/or a motor rotation speed is controlled via an accelerator actuator. In a pure gas car, the engine rotation speed is controlled. In a pure electric vehicle, the motor rotation speed is controlled. In a hybrid car, both of the engine rotation speed and the motor rotation speed are controlled. The accelerator actuator can be electronically controlled by at least one of an engine ECU and a motor ECU.

Blinker switch 54 is an operation unit for blinking a blinker so as to notify a course of the vehicle to the outside. When blinker switch 54 is turned on/off by a driver, the blinker is turned on/off via a blinker controller. The blinker controller includes a drive circuit such as a relay controlling power supply to a blinker lamp, or the like.

Each of the steering ECU, the brake ECU, the engine ECU, the motor ECU, and the blinker controller and automatic driving control device 20 are connected to each other by wired communication such as a CAN, a dedicated line, or the like. Each of the steering ECU, the brake ECU, the engine ECU, the motor ECU, and the blinker controller respectively transmits a state signal indicating the state of each of a steering, a brake, an engine, a motor, and a blinker lamp to automatic driving control device 20.

In the automatic driving mode, each of the steering ECU, the brake ECU, the engine ECU, and the motor ECU drives the corresponding actuator according to a control signal supplied from automatic driving control device 20. In a manual driving mode, a configuration in which an instruction is directly transferred from each of steering 51, brake pedal 52, and accelerator pedal 53 to the corresponding actuator in a mechanical way may be employed, or a configuration in which electronic control intervenes via the corresponding ECU may be employed. The blinker controller turns on/off the blinker lamp according to the control signal supplied from automatic driving control device 20 or an instruction signal from blinker switch 54.

Automatic driving control device 20 is an automatic driving controller that has an automatic driving control function, and includes control unit 21, memory unit 22, and input-output unit 23. The configuration of control unit 21 may be realized by cooperation between hardware resources and software resources or only hardware resources. As the hardware resources, a processor, a read only memory (ROM), a random access memory (RAM), and other large scale integrated (LSI) circuits can be used, and as software resources, an operating system, an application, and a program such as a firmware or the like can be used. Memory unit 22 includes a non-volatile recording medium such as a flash memory or the like. Input-output unit 23 performs various communication controls according to various communication formats.

Control unit 21 calculates a control value for controlling an automatic control target such as a traveling direction of vehicle 1 by applying various parameter values collected from detection unit 40 and various ECUs to an automatic driving algorithm. Control unit 21 transfers the calculated control value to the ECU or controller of each control target. In the present embodiment, the control value is transferred to the steering ECU, the brake ECU, the engine ECU, and the blinker controller. In a case of an electric vehicle or a hybrid car, the control value is transferred to the motor ECU instead of the engine ECU or in addition to the engine ECU.

Driving support device 10 is a human machine interface (HMI) controller for performing an interface function between vehicle 1 and a driver, and includes determination unit 11, image generation unit 12, instruction unit 13, and input-output unit 14. Determination unit 11, image generation unit 12, and instruction unit 13 can be realized by cooperation between hardware resources and software resources, or only hardware resources. As the hardware resources, a processor, a ROM, a RAM, and other LSI circuits can be used, and as software resources, an operating system, an application, and a program such as a firmware or the like can be used. Input-output unit 14 performs various communication controls according to various communication formats. Input-output unit 14 includes image output unit 14a, operation signal input unit 14b, command output unit 14c, and vehicle information input unit 14d. Image output unit 14a outputs an image generated by image generation unit 12 to display unit 31. Operation signal input unit 14b receives an operation signal that is input from input unit 32 by an operation of a driver, a passenger, or a user outside the vehicle, and outputs the operation signal to determination unit 11. Command output unit 14c outputs the command instructed by instruction unit 13 to automatic driving controller 20. Vehicle information input unit 14d receives detection data acquired by detection unit 40 or vehicle information generated by automatic driving controller 20, and outputs the detection data or the vehicle information to image generation unit 12.

Automatic driving controller 20 and HMI controller 10 are directly connected to each other by a signal line. A configuration in which automatic driving controller 20 and HMI controller 10 are connected to each other via a CAN may be employed. A configuration in which automatic driving controller 20 and HMI controller 10 are integrated into one controller may be also employed.

Figure 2:
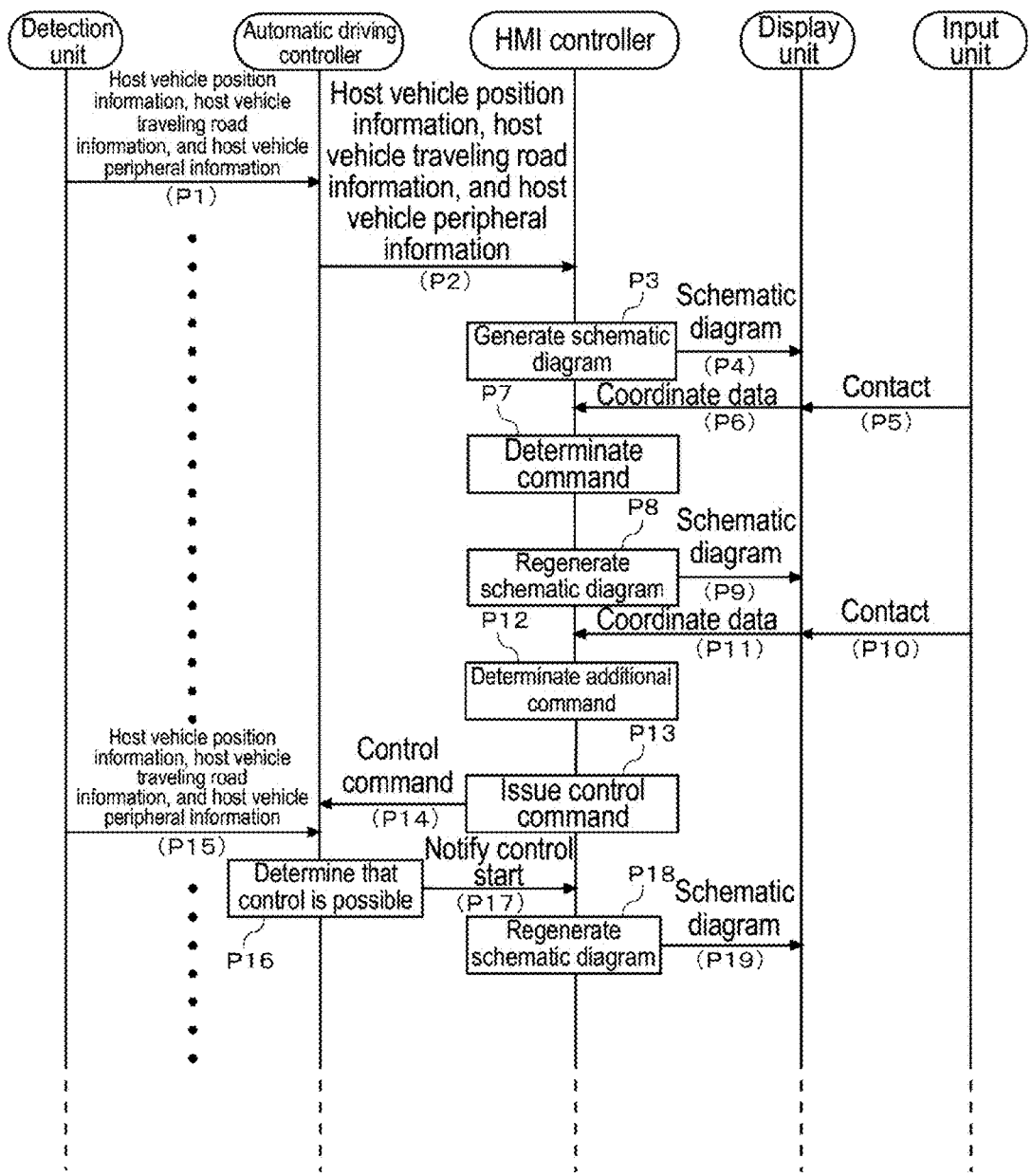
FIG. 2 is a diagram illustrating an example of a basic sequence of a detection unit, an automatic driving controller, a HMI controller, a display unit, and an input unit in FIG. 1.

FIG. 2 is a diagram illustrating an example of a basic sequence of detection unit 40, automatic driving controller 20, HMI controller 10, display unit 31, and input unit 32 in FIG. 1. Detection unit 40 detects host vehicle position information, host vehicle traveling road information, and host vehicle peripheral information, and outputs the detected information to automatic driving controller 20 (P1). Automatic driving controller 20 outputs the host vehicle position information, the host vehicle traveling road information, and the host vehicle peripheral information acquired from detection unit 40 to HMI controller 10 (P2). HMI controller 10 generates a schematic diagram including the host vehicle and the host vehicle peripheral situation based on the information acquired from automatic driving controller 20 (P3). HMI controller 10 outputs the generated schematic diagram to display device 30, and the schematic diagram is displayed on display unit 31 (P4).

A user who views the schematic diagram displayed on display unit 31 comes into contact with input unit 32 (P5). Display unit 31 outputs coordinate data at a position at which the contact is detected to HMI controller 10 (P6). HMI controller 10 determines a type of the command based on the coordinate data acquired from display device 30 (P7). HMI controller 10 receives an additional input until a certain period of time has elapsed (P8 to P12). After determination of the command, HMI controller 10 regenerates a schematic diagram indicating that the command is being instructed (P8). HMI controller 10 outputs the regenerated schematic diagram to display device 30, and the regenerated schematic diagram is displayed on display unit 31 (P9). In a case where the command corresponding to the gesture operation by the touch of a user does not exist, HMI controller 10 generates a schematic diagram including an error message, and outputs the schematic diagram to display device 30, and the schematic diagram is displayed on display unit 31.

When a user who views the schematic diagram indicating that the command is being instructed comes into contact with input unit 32 (P10), display unit 31 outputs the coordinate data at a position at which the contact is detected to HMI controller 10 (P11). HMI controller 10 performs additional command processing based on the coordinate data acquired from display device 30 (P12). In a case where there is no input of a new command in the additional command processing (P12), HMI controller 10 issues a command determined in P7 to automatic driving controller 20 (P13 and P14). In a case where a new command is input in the additional command processing (P12), HMI controller 10 issues a new command to automatic driving controller 20. In a case where the new command that is input is a cancel command, HMI controller 10 cancels the issue of a command. Processing of overwriting and canceling of the original command due to a new command may be performed by automatic driving controller 20. In this case, after the command determination processing in P7 and P12, HMI controller 10 transmits the command to automatic driving controller 20, and performs processing of overwriting and canceling according to an internal state of automatic driving controller 20.

Detection unit 40 periodically detects the host vehicle position information, the host vehicle traveling road information, and the host vehicle peripheral information, and outputs the information to automatic driving controller 20 (P15). Automatic driving controller 20 determines whether or not control instructed by the command issued from HMI controller 10 is executable (P16), based on the information. In a case where it is determined that the control is executable, automatic driving controller 20 outputs a control start notification to HMI controller 10 (P17). When the control start notification is received, HMI controller 10 regenerates a schematic diagram including a message indicating that the control is being performed (P18). HMI controller 10 outputs the regenerated schematic diagram to display device 30, and the regenerated schematic diagram is displayed on the display unit 31 (P19). Although not illustrated, automatic driving controller 20 calculates a control value for controlling driving operation unit 50 that performs the issued command by applying various parameter values collected from detection unit 40 or various ECUs to an automatic driving algorithm, and transfers the control value to the ECU or controller of each control target. The control value is a specific value for automatically controlling control target such as a traveling direction of vehicle 1 or the like. Driving operation unit 50 operates based on the specific control value. When a predetermined control value or the detection data acquired by detection unit 40 is a predetermined value (in a predetermined range), and when automatic driving controller 20 determines that a condition of the issued command is satisfied, driving operation unit 50 determines that performing of the command is completed.

When a control completion notification is received from automatic driving controller 20, HMI controller 10 generates a schematic diagram including a message indicating that control is completed, and outputs the generated schematic diagram to display device 30. During a period for which an operation from a user is not received, HMI controller 10 generates a schematic diagram including a message indicating that an operation is not received, and outputs the generated schematic diagram to display device 30.

Figure 3:
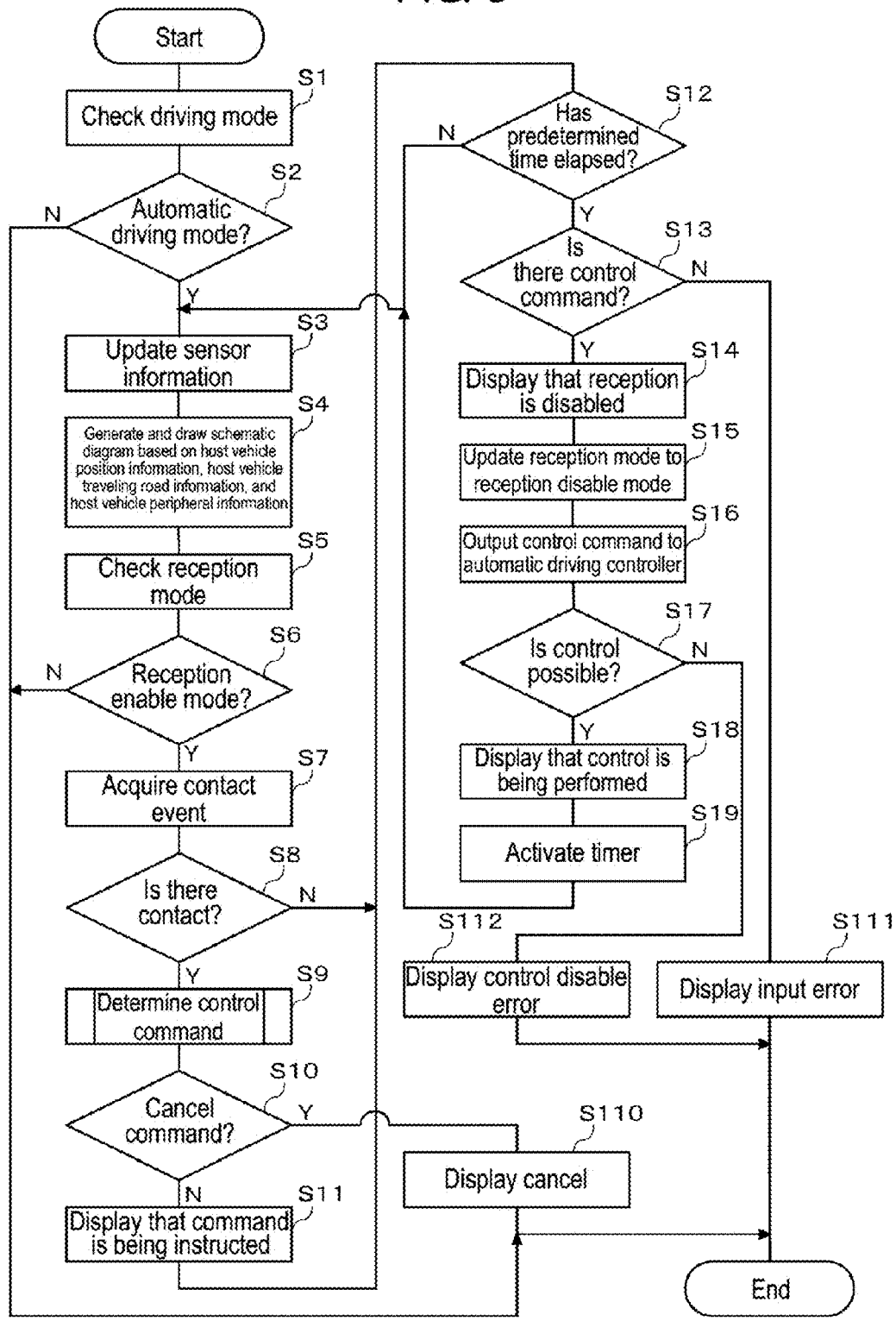
FIG. 3 is a diagram illustrating an example of a basic flowchart for explaining processing in the HMI controller in FIG. 1.

FIG. 3 is a diagram illustrating an example of a basic flowchart for explaining processing of HMI controller 10 in FIG. 1. Determination unit 11 of HMI controller 10 checks whether or not a driving mode is an automatic driving mode or a manual driving mode (S1). In the manual driving mode (N in S2), the process ends. In a case of the automatic driving mode (Y in S2), processing is performed as follows.

Sensor information that is input from detection unit 40 to automatic driving controller 20 is updated at any time (S3). Image generation unit 12 of HMI controller 10 generates a schematic diagram including the host vehicle and the host vehicle peripheral situation based on the host vehicle position information, the host vehicle traveling road information, and the host vehicle peripheral information that are input from automatic driving controller 20, and draws the generated schematic diagram on display unit 31 (S4). Determination unit 11 checks whether or not a reception mode is a reception enable mode in which an operation from a user can be received or a reception disable mode in which an operation from a user cannot be received (S5). In a case where the reception mode is the reception disable mode (N in S6), the process ends. In a case where the reception mode is the reception enable mode (Y in S6), determination unit 11 determines whether or not there is a contact to input unit 32 by a user (S7). In a case where there is no contact to input unit 32 by a user (N in S8), predetermined-time elapse determination processing (S12) to be described later is performed. In a case where there is a contact to input unit 32 by a user (Y in S8), determination unit 11 determines a control command according to a gesture operation input by a user (S9). The details of the control command determination processing will be described later.

In a case where the control command determined in step S9 is not a cancel command (N in S10), image generation unit 12 displays that the command is being instructed on display unit 31 (S11). When a predetermined time has elapsed after the control command is determined (Y in S12), in a case where there is a control command determined in step S9 (Y in S13), operation reception disable is displayed on display unit 31 (S14), determination unit 11 updates the reception mode from the reception enable mode to the reception disable mode (S15), and instruction unit 13 outputs the determined control command to automatic driving controller 20 (S16). Until a predetermined time has elapsed (N in S12), the process transitions to step S3.

In step S10, in a case where the determined control command is a cancel command (Y in S10), cancel is displayed (S110), and the process ends. In step S13, in a case where there is no control command determined in step S9 (N in S13), an input error is displayed (S111), and the process ends. Automatic driving controller 20 periodically detects the host vehicle position information, the host vehicle traveling road information, and the host vehicle peripheral information from detection unit 40. Since the host vehicle peripheral situation constantly changes, after the control command is output to automatic driving controller 20, there is a case where it is determined that the control command is not executable. For example, after a following instruction, there is a case where other cars interrupt between the host vehicle and a nearby vehicle. In a case where it is determined that the control command is executable by automatic driving controller 20 (Y in S17), image generation unit 12 displays that the control is being performed on display unit 31 (S18), and starts counting by activating a timer (S19). In a case where it is determined that the control is not executable by automatic driving controller 20 (N in S17), image generation unit 12 displays a control disable error on display unit 31 (S112).

Figure 4:
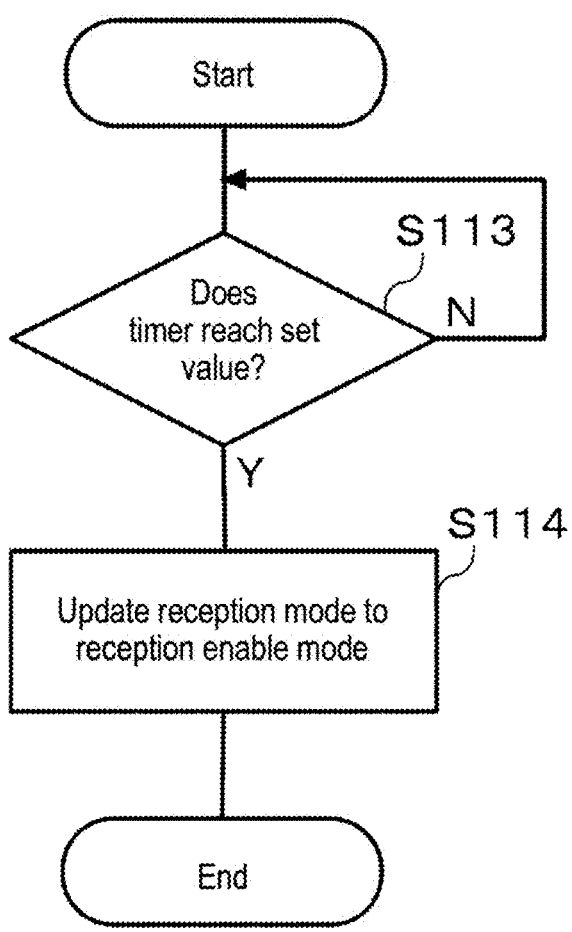
FIG. 4 is a flowchart for explaining update processing of a reception mode.

FIG. 4 is a flowchart for explaining update processing of a reception mode. When a count value of the timer reaches a set value (for example, 10 seconds) (Y in S113), determination unit 11 of HMI controller 10 updates the reception mode from the reception disable mode to the reception enable mode (S114). The count value of the timer may be changed according to the host vehicle peripheral situation. When a notification indicating completion of the control is received from automatic driving controller 20, or when it is determined that the control according to the control command is completed based on behavior of vehicle 1, determination unit 11 may update the reception mode from the reception disable mode to the reception enable mode.

Figure 5:
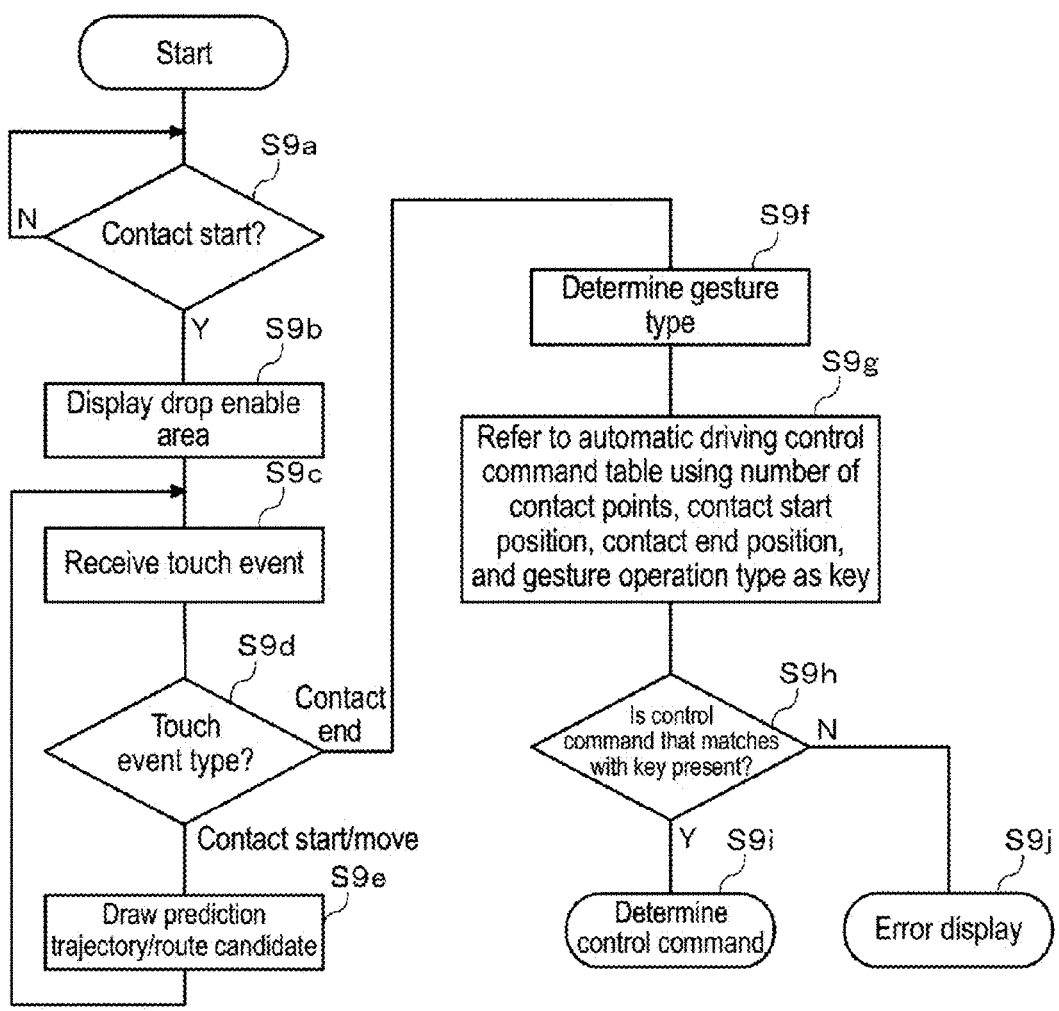
FIG. 5 is a flowchart illustrating an example of command determination processing in a case where a gesture operation is input in step S9 of FIG. 3.

FIG. 5 is a flowchart illustrating an example of the command determination processing in step S9 of FIG. 3 in a case where a gesture operation is input. When a contact to input unit 32 is started by a user (Y in S9a), image generation unit 12 draws a drop enable area in the schematic diagram, and displays the area on display unit 31 (S9b).

Determination unit 11 receives a touch event generated in input unit 32 (S9c), and determines a type of the touch event (S9d). In a case where the type of the touch event is a contact start/movement (a contact start/movement in S9d), image generation unit 12 draws a predicted trajectory/route candidate of vehicle 1 in the schematic diagram, and the predicted trajectory/route candidate of vehicle 1 is displayed on display unit 31 (S9e). Next, the process returns to step S9c.

In a case where the type of the touch event is a contact end (a contact end in S9d), determination unit 11 determines a type of the gesture operation. As a typical gesture operation, a drag-and-drop operation, a flick operation, a swipe operation, a pinch in/pinch out operation, and a rotation operation are included. Determination unit 11 determines a type of the gesture operation based on a time-series transition in the touch event (S9f). Specifically, a drag-and-drop operation, a flick operation, and a swipe operation are distinguished based on a staying time at a contact start position, a moving speed after a movement is started, and a staying time at a contact end position. In a case where contact points are two points and the distance between the two points is changed by a predetermined distance or more, a pinch in/pinch out operation is determined. In a case where the distance between the two points is not changed by a predetermined distance or more and the positions of the two points are changed, a rotation operation is determined.

Determination unit 11 refers to an automatic driving control table using the number of the contact points, the contact start position, the contact end position, and the type of the gesture operation as a key (S9g). In a case where a control command that matches with four keys is present in an automatic driving control command table (Y in S9h), determination unit 11 determines that the control command is a control command to be issued to automatic driving controller 20 (S9i). In a case where a control command that matches with four keys is absent in the automatic driving control command table (N in S9h), image generation unit 12 displays an error message on display unit 31 (S9s).

FIG. 6 is a diagram illustrating an example of automatic driving control command table 11a. Automatic driving control command table 11a is built in determination unit 11. Hereinafter, in the present embodiment, an example in which the contact start position is a host vehicle mark in the schematic diagram will be described. Automatic driving control command table 11a illustrated in FIG. 6 defines a nearby vehicle mark, an emergency vehicle mark, a pedestrian mark, a lane, a road shoulder, an intersection, and a specific area as a contact end position. A drag-and-drop operation, a flick/swipe operation, a pinch in/pinch out operation, and a rotation operation are defined as a gesture operation.

When a user drags and drops a host vehicle mark onto a nearby vehicle mark, a command that instructs following traveling/line traveling is issued. In a case where a user drags and drops a host vehicle mark onto an emergency vehicle (an ambulance or the like) mark, when a position of the emergency vehicle mark is positioned at the right side of a position of the host vehicle mark, a command that instructs a left-aligned temporary stop is issued. In a case where a position of the emergency vehicle mark is positioned at the left side of a position of the host vehicle mark, a command that instructs a right-aligned temporary stop is issued. When a user drag and drops a host vehicle mark onto a pedestrian mark, a command that instructs a stop at the next to a pedestrian is issued.

When a user drags and drops a host vehicle mark onto another lane, in a case where the host vehicle mark is not positioned in the vicinity of an intersection, a command that instructs traffic lane change to the lane is issued. When the host vehicle mark is positioned in the vicinity of an intersection, in a case where the lane on which the host vehicle mark is dropped is a right-turn lane, a command that instructs traffic lane change to the right-turn lane and right turn is issued. When the host vehicle mark is positioned in the vicinity of an intersection, in a case where the lane on which the host vehicle mark is dropped is a left-turn lane, a command that instructs traffic lane change to the left-turn lane and left turn is issued.

When a user drags and drops a host vehicle mark onto a road shoulder, a command that instructs parking at the road shoulder is issued. When a user drags and drops a host vehicle mark onto an entrance of a lane after right turn in an intersection, a command that instructs right turn is issued. When a user drags and drops a host vehicle mark onto an entrance of a lane after left turn in an intersection, a command that instructs left turn is issued.

When a user drags and drops a host vehicle mark onto a specific area other than a lane, an intersection, and a road shoulder, a command according to the specific area is issued. For example, a command that instructs a temporary retreat to a specific area is issued. In a case where the specific area is an area in a road guide sign on which a place name or a region name is displayed, a command that instructs a route change to a destination corresponding to the place name or the region name is issued. A command that instructs setting of a passing spot corresponding to the place name or the region name may be issued. In a case where the specific area is an area in a road guide sign on which a road or a road name is displayed, a command that instructs a route change to a route through the road is issued. In a case where the specific area is an area in which an exit guide sign of a toll road is displayed, a command that instructs the host vehicle to exit the toll road through an exit is issued.

When a user flicks or swipes a host vehicle mark, a command that instructs a vehicle speed change according to a moving direction and a moving distance of the host vehicle mark may be issued. For example, a vehicle speed may be set to be speeded up according to a swipe toward an upward direction, set to be speeded down according to a swipe toward a down direction, and set to be significantly changed as a moving distance increases. When a user flicks or swipes a host vehicle mark, a command that instructs a change of the inter-vehicle distance between the host vehicle and a preceding vehicle according to a moving direction and a moving distance of the host vehicle mark may be issued. For example, the inter-vehicle distance between the host vehicle and a preceding vehicle may be set to be shorten according to a swipe toward an upward direction, set to be increased according to a swipe toward a down direction, and set to be significantly changed as a moving distance increases.

In a case where a user flicks or swipes a host vehicle mark, when there is another lane, a command that instructs traffic lane change to the lane may be issued. In a case where a user flicks or swipes a host vehicle mark, when the host vehicle mark is flicked or swiped on a right-turn lane in the vicinity of an intersection, a command that instructs traffic lane change to a right-turn lane and right turn is issued. In a case where the host vehicle mark is flicked or swiped on a left-turn lane in the vicinity of an intersection, a command that instructs traffic lane change to a left-turn lane and left turn is issued.

When a user touches two points on a host vehicle mark and pinches in or pinches out the host vehicle mark, a command that instructs a change of a vehicle speed according to a distance change between the two points is issued. For example, a vehicle speed may be set to be speeded down according to pinch-in operation, set to be speeded up according to a pinch-out operation, and set to be significantly changed as a distance between the two points increases.

In a case where a user touches two points on a host vehicle mark and a nearby vehicle mark, and pinches in or pinches out a distance between the host vehicle mark and the nearby vehicle mark, when the host vehicle and the nearby vehicle are in following traveling, a command that instructs a change of an inter-vehicle distance between the host vehicle and the nearby vehicle is issued. For example, an inter-vehicle distance between the host vehicle and the nearby vehicle may be set to be shorten according to pinch-in operation, set to be increased according to a pinch-out operation, and set to be significantly changed as a distance between the two points increases. In a case where a user touches two points on a host vehicle mark and a nearby vehicle mark, and pinches in or pinches out a distance between the host vehicle mark and the nearby vehicle mark, when the host vehicle and the nearby vehicle are not in following traveling, a command that instructs a normal change of an inter-vehicle distance between the host vehicle and the nearby vehicle is issued. In this case, even when an inter-vehicle distance between the host vehicle and the nearby vehicle changes as the time is elapsed, control for maintaining a constant inter-vehicle distance does not operate.

In a case where a user touches two points on a host vehicle mark and rotates the two points, when the host vehicle mark is positioned in the vicinity of an intersection, a command that instructs right turn or left turn according to a rotation direction of the two points is issued. In a case where a user touches two points on a host vehicle mark and rotates the two points, when the host vehicle mark is positioned in the vicinity of a parking space, a command that instructs a direction change of the host vehicle according to a rotation direction of the two points is issued.

In a case where a user touches two points on a host vehicle mark and a nearby vehicle mark, and rotates the two points, when the host vehicle and the nearby vehicle are in following traveling/line traveling, a command that instructs inter-change of a position of the host vehicle and a position of the nearby vehicle is issued. In a case where a user touches two points on a host vehicle mark and a nearby vehicle mark, and rotates the two points, when the host vehicle and the nearby vehicle are not in following traveling/line traveling, a command that instructs the host vehicle to pass the nearby vehicle is issued.

A specific control method for a command may be changed according to a context. For example, in a case where a user moves a host vehicle mark forward a preceding vehicle (nearby vehicle) mark, although a command that instructs the host vehicle to pass the preceding vehicle is issued in the same manner, a combination in which a method of passing a nearby vehicle varies according to a context may be used. For example, generally, in the Japanese traffic rules, although it is allowed to pass a nearby vehicle from a right-side traffic lane, in a case where there is no nearby vehicle traveling on a left-side traffic lane, the host vehicle may pass a nearby vehicle from a left-side traffic lane. In addition, passing may be performed on a route that matches a taste of a driver with reference to personal preference data. In a specific control method related to a command, for example, determination unit 11 of HMI controller 10 may determine the specific control method in consideration of a course, an execution timing, a speed, and the like, and transmit a command including the specific control method to automatic driving controller 20. Alternatively, after receiving a command, automatic driving controller 20 may determine a specific control method. Further, a specific control method may be selected by a driver by displaying a selection of a specific control method that is determined by HMI controller 10 or automatic driving controller 20 on display unit 31, or by visually/tactually notifying a driver of a specific control method using a notification unit including a speaker or a vibration unit that is not illustrated.

Automatic driving control command table 11a illustrated in FIG. 6 described above includes a combination in which the content of a command varies according to a context even though the number of contact points, a contact start position, a contact end position, and a type of a gesture are the same. As a context, host vehicle peripheral environment information is referred to, and for example, the relative position between the host vehicle and the nearby vehicle, the presence/absence of a traffic lane, the presence/absence of an intersection, whether or not the host vehicle and the nearby vehicle are in following traveling/line traveling, a direction of the host vehicle, or the like is referred to. Without referring to a context, a command may be designed to be uniquely determined by only the number of contact points, a contact start position, a contact end position, and the type of a gesture. For example, when a user flicks or swipes a host vehicle mark, a command that instructs a speed change may be designed to be globally issued even though a host vehicle peripheral environment is in any state.

Hereinafter, several examples of gesture operations that are specified in automatic driving control command table 11a illustrated in FIG. 6 will be described. In the following examples, it is assumed that a touch panel display in which display unit 31 and input unit 32 are integrated is used.

FIG. 7 is a flowchart illustrating an example of a gesture operation that drags and drops a host vehicle icon to another lane. Determination unit 11 of HMI controller 10 receives a touch event (DOWN) from a touch panel (S20). The touch event (DOWN) is an event representing a contact state change on the touch panel from a non-contact state to a contact state by a finger or a pen. Determination unit 11 determines whether or not a coordinate detected by the touch event (DOWN) is present in a display area of the host vehicle icon (S21). In a case where the coordinate detected by the touch event is present outside the display area of the host vehicle icon (N in S21), it is determined that the gesture operation is not a traffic lane change instruction, and the process ends.

In a case where the coordinate detected by the touch event is present in the display area of the host vehicle icon (Y in S21), determination unit 11 receives a touch event (MOVE) from the touch panel (S22). The touch event (MOVE) is an event representing a change from a contact state on a certain point of the touch panel to a contact state on another point of the touch panel by a finger or a pen. Then, determination unit 11 receives a touch event (UP) from the touch panel (S23). The touch event (UP) is an event representing a contact state change on the touch panel from a contact state to a non-contact state by a finger or a pen.

Determination unit 11 determines whether or not a coordinate detected by the touch event (UP) is present in another lane in the same direction as the travelling direction of the host vehicle (S24). In a case where the coordinate detected by the touch event (UP) is present in another lane in the same direction as the travelling direction of the host vehicle (Y in S24), instruction unit 13 issues a traffic lane change instruction command to automatic driving controller 20 (S25). In a case where the coordinate detected by the touch event (UP) is not present in another lane in the same direction as the travelling direction of the host vehicle (N in S24), it is determined that the gesture operation is not a traffic lane change instruction, and the process ends.

Figure 8:
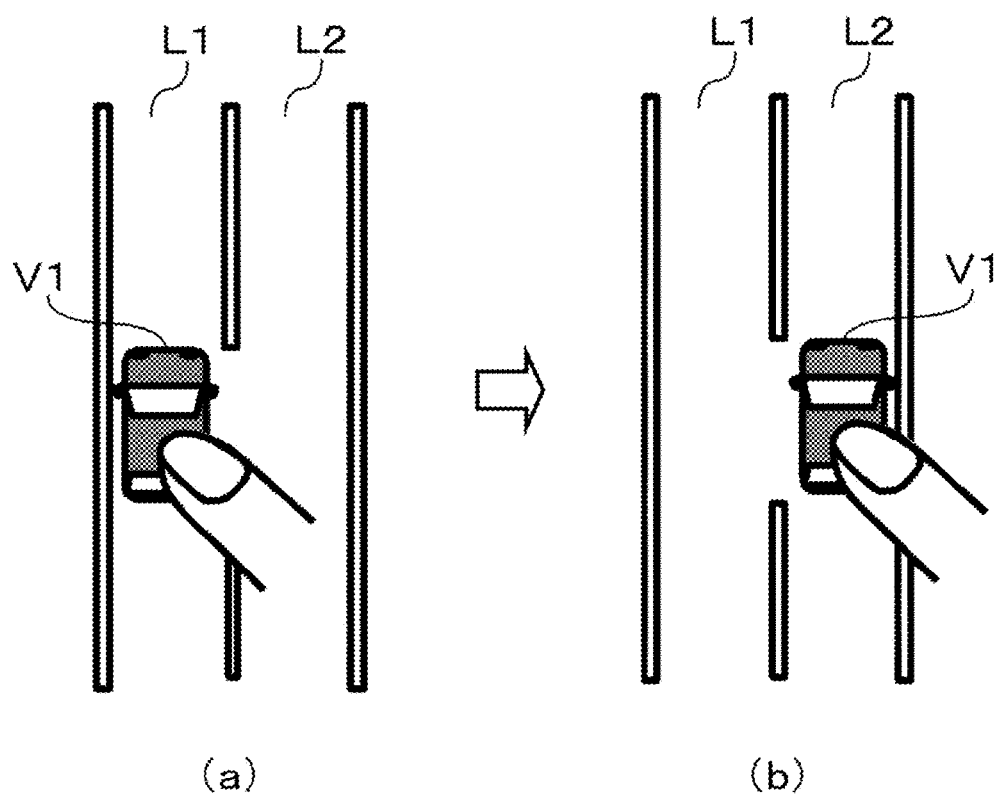
FIG. 8 is a diagram illustrating an example of a gesture operation according to the flowchart of FIG. 7.

FIG. 8 is a diagram illustrating an example of a gesture operation according to the flowchart of FIG. 7. In the schematic diagram illustrated in (a) of FIG. 8, a first lane L1 and a second lane L2 are displayed, and a host vehicle icon V1 is displayed on the first lane L1. As display forms of the host vehicle and a peripheral situation including a road, various display forms are considered. A real photographed image may be used, and a fine CG image or an animation image may be used. Display of the host vehicle is not limited to an icon, and the host vehicle may be displayed as a more simple mark or character, or may be displayed as a real photographed image. In other words, there is no problem as long as the host vehicle is displayed on a screen as an object in any display form.

In a case where a driver is about to change the traffic lane of the host vehicle from the first lane L1 to the second lane L2, as illustrated in (a) of FIG. 8, a driver drags the host vehicle icon V1 on the first lane L1, and as illustrated in (b) of FIG. 8, drops the host vehicle icon V1 on the second lane L2. Accordingly, a command that instructs traffic lane change is issued.

Figure 9:
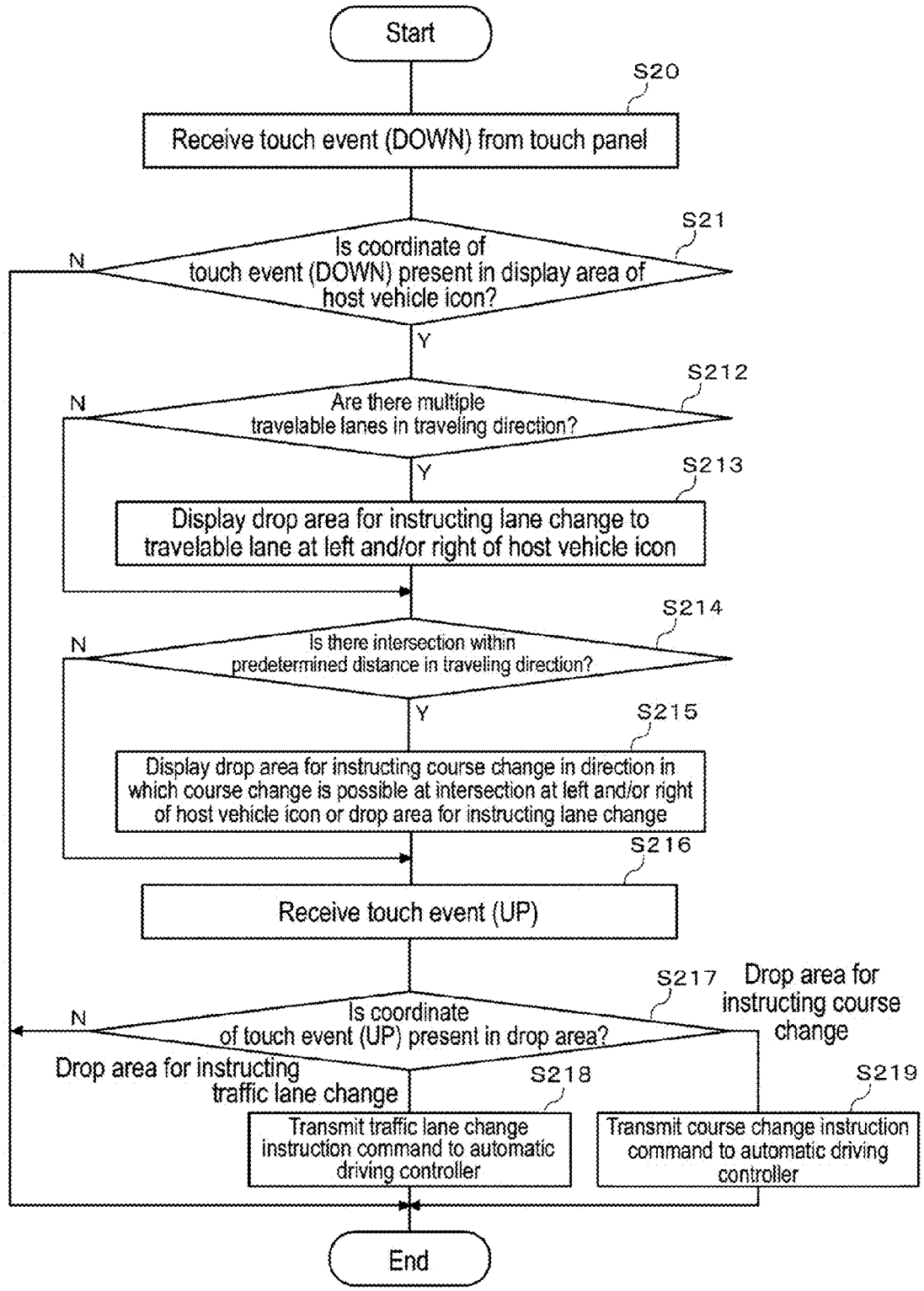
FIG. 9 is a flowchart illustrating an example of a gesture operation that flicks a host vehicle icon.

FIG. 9 is a flowchart illustrating an example of a gesture operation that flicks a host vehicle icon. Determination unit 11 of HMI controller 10 receives a touch event (DOWN) from a touch panel (S20). Determination unit 11 determines whether or not a coordinate detected by the touch event (DOWN) is present in a display area of the host vehicle icon (S21). In a case where the coordinate detected by the touch event is present outside the display area of the host vehicle icon (N in S21), it is determined that the gesture operation is not a traffic lane change instruction, and the process ends.

In a case where the coordinate detected by the touch event is present in the display area of the host vehicle icon (Y in S21), determination unit 11 determines whether or not there are multiple travelable lanes in the traveling direction of the host vehicle (S212). In a case where there are multiple travelable lanes (Y in S212), image generation unit 12 generates a drop area for instructing lane change to the travelable lane at the left and/or right of the host vehicle icon, and displays the drop area on the touch panel (S213). In a case where there are not multiple travelable lanes (N in S212), the process of S213 is skipped.

Determination unit 11 determines whether or not there is an intersection within a predetermined distance in the traveling direction (S214). In a case where there is an intersection within a predetermined distance in the traveling direction (Y in S214), image generation unit 12 generates a drop area for instructing course change in a direction in which course change is possible at an intersection at the left and/or right of the host vehicle icon or the drop area for instructing lane change, and displays the drop area for instructing course change on the touch panel (S215). In a case where there is no intersection within a predetermined distance in the traveling direction (N in S214), the process of S215 is skipped.

Determination unit 11 receives a touch event (UP) from the touch panel (S216). Determination unit 11 determines whether or not a coordinate detected by the touch event (UP) is present in the drop area (S217). In a case where the coordinate detected by the touch event (UP) is not present in the drop area (N in S217), it is determined that the gesture operation is not a traffic lane change instruction, and the process ends. In a case where the coordinate detected by the touch event (UP) is present in the drop area for instructing traffic lane change (drop area for instructing traffic lane change in S217), instruction unit 13 issues a traffic lane change instruction command to automatic driving controller 20 (S218). In a case where the coordinate detected by the touch event (UP) is present in the drop area for instructing course change (drop area for instructing course change in S217), instruction unit 13 issues a course change instruction command to automatic driving controller 20 (S219).

Figure 10A:
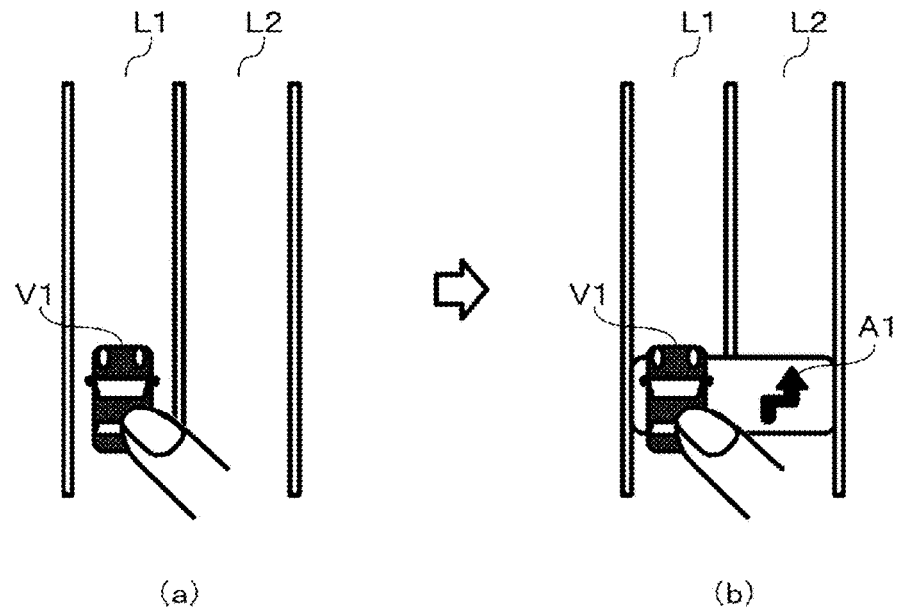
FIG. 10A is a diagram illustrating an example of a gesture operation according to the flowchart of FIG. 9.
Figure 10B:
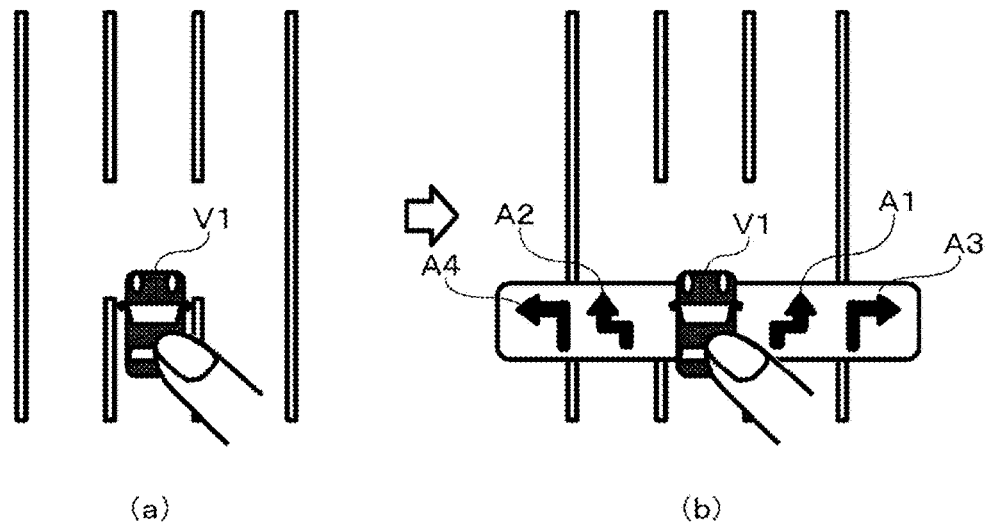
FIG. 10B is a diagram illustrating an example of a gesture operation according to the flowchart of FIG. 9.

FIG. 10A and FIG. 10B are diagrams illustrating an example of a gesture operation according to the flowchart of FIG. 9. In a case where a driver is about to change the traffic lane of the host vehicle from the first lane L1 to the second lane L2, as illustrated in (a) of FIG. 10A, a driver touches the host vehicle icon V1 on the first lane L1. When the host vehicle icon V1 is touched, as illustrated in (b) of FIG. 10B, the drop area A1 for instructing traffic lane change to the second lane L2 is displayed. When a user flicks the host vehicle icon V1 onto the drop area A1, a traffic lane change instruction command for instructing traffic lane change to the second lane L2 is issued.

In a case where there is an intersection ahead, as illustrated in (a) of FIG. 10B, when a user touches the host vehicle icon V1, as illustrated in (b) of FIG. 10B, a drop area A1 for instructing traffic lane change to a right lane, a drop area A2 for instructing traffic lane change to a left lane, a drop area A3 for instructing right turn, and a drop area A4 for instructing left turn are displayed. A user flicks the host vehicle icon V1 onto any one of the drop areas, and thus the corresponding command is issued.

FIG. 11 is a flowchart illustrating an example of a gesture operation that touches two points on a host vehicle icon and a nearby vehicle icon and rotates the two points. Determination unit 11 of HMI controller 10 receives a two-point touch event (DOWN) from the touch panel (S38). Determination unit 11 determines whether or not a coordinate of one point detected by the touch event (DOWN) is present in a display area of the host vehicle icon (S39). In a case where the coordinate of one point detected by the touch event (DOWN) is present outside the display area of the host vehicle icon (N in S39), it is determined that the gesture operation is not a passing instruction, and the process ends.

In a case where the coordinate of one point detected by the touch event (DOWN) is present in the display area of the host vehicle icon (Y in S39), determination unit 11 determines whether or not a coordinate of the other point detected by the touch event (DOWN) is present in a display area of the nearby vehicle (preceding vehicle) icon (S310). In a case where the coordinate of the other point detected by the touch event (DOWN) is present outside the display area of the nearby vehicle (preceding vehicle) icon (N in S310), it is determined that the gesture operation is not a passing instruction, and the process ends.

In a case where the coordinate of the other point detected by the touch event (DOWN) is present in the display area of a nearby vehicle (preceding vehicle) icon (Y in S310), determination unit 11 receives a touch event (MOVE) from the touch panel (S311). Then, determination unit 11 receives a two-point touch event (UP) from the touch panel (S312). Determination unit 11 determines whether or not a coordinate detected by the touch event (UP) on the host vehicle icon is present in front of a coordinate detected by the touch event (UP) on a nearby vehicle icon (S313). In a case where the host vehicle icon is present in front of a nearby vehicle icon (Y in S313), instruction unit 13 issues a passing instruction command for passing a nearby vehicle according to the nearby vehicle (preceding vehicle) icon to automatic driving controller 20 (S314). In a case where the host vehicle icon is not present in front of a nearby vehicle icon (N in S313), it is determined that the gesture operation is not a passing instruction, and the process ends.

FIG. 12 is a diagram illustrating an example of a gesture operation according to the flowchart of FIG. 11. In a case where a driver is about to pass the nearby vehicle, as illustrated in (a) of FIG. 12, a driver touches the host vehicle icon V1 and a nearby vehicle icon V2 with two fingers, and as illustrated in (b) of FIG. 12 and (c) of FIG. 12, interchanges the front and the rear of the host vehicle icon V1 and a nearby vehicle icon V2, and drops the host vehicle icon V1 and a nearby vehicle icon V2. Accordingly, a passing instruction command is issued. As a gesture operation for issuing a passing instruction command, an operation of changing the relative positions of the host vehicle icon and the nearby vehicle icon may be employed other than the above operation.

Figure 13:
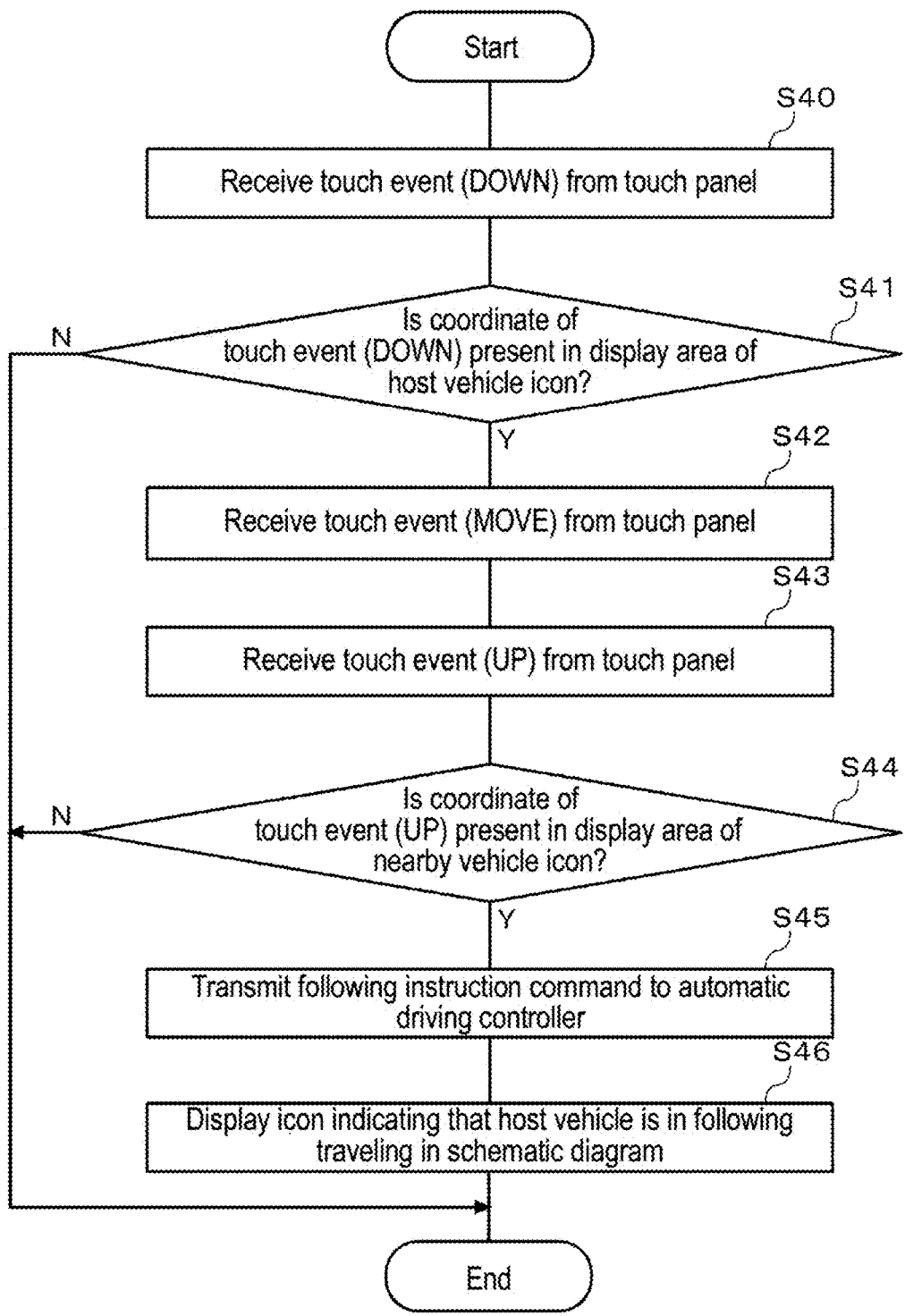
FIG. 13 is a flowchart illustrating an example of a gesture operation that drags and drops a host vehicle icon onto a nearby vehicle icon.

FIG. 13 is a flowchart illustrating an example of a gesture operation that drags and drops a host vehicle icon onto a nearby vehicle icon. Determination unit 11 of HMI controller 10 receives a touch event (DOWN) from the touch panel (S40). Determination unit 11 determines whether or not a coordinate detected by the touch event (DOWN) is present in a display area of the host vehicle icon (S41). In a case where the coordinate detected by the touch event (DOWN) is present outside the display area of the host vehicle icon (N in S41), it is determined that the gesture operation is not a following instruction, and the process ends.

In a case where the coordinate detected by the touch event (DOWN) is present in the display area of the host vehicle icon (Y in S41), determination unit 11 receives a touch event (MOVE) from the touch panel (S42). Then, determination unit 11 receives a touch event (UP) from the touch panel (S43).

Determination unit 11 determines whether or not a coordinate detected by the touch event (UP) is present in a display area of the nearby vehicle icon (S44). In a case where the coordinate detected by the touch event (UP) is present in the display area of the nearby vehicle icon (Y in S44), instruction unit 13 issues a following instruction command for instructing the host vehicle to travel following the nearby vehicle according to the nearby vehicle icon to automatic driving controller 20 (S45). Image generation unit 12 displays a following icon indicating that the host vehicle is in traveling following the nearby vehicle at a position between the host vehicle icon and the nearby vehicle icon in the schematic diagram (S46). In a case where the coordinate detected by the touch event (UP) is present outside the display area of the nearby vehicle icon (N in S44), it is determined that the gesture operation is not a following instruction command, and the process ends.

Figure 14:
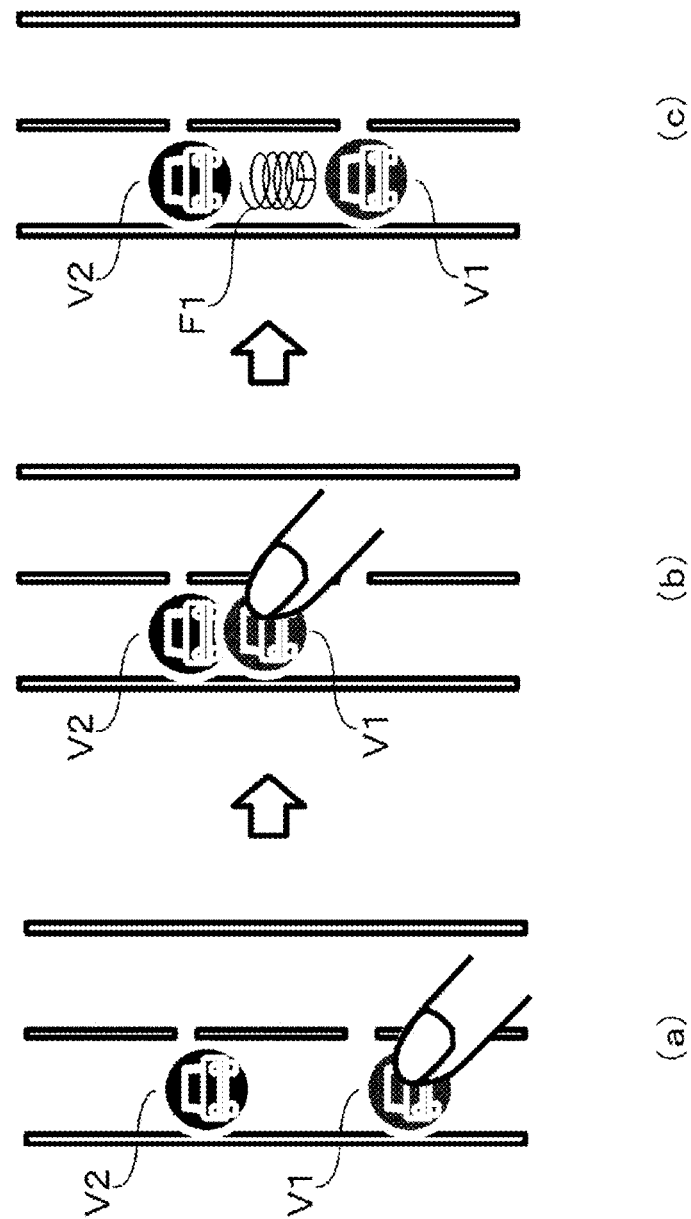
FIG. 14 is a diagram illustrating an example of a gesture operation according to the flowchart of FIG. 13.

FIG. 14 is a diagram illustrating an example of a gesture operation according to the flowchart of FIG. 13. When a driver is about the host vehicle to travel following the nearby vehicle, as illustrated in (a) of FIG. 14, a driver drags the host vehicle icon V1, and as illustrated in (b) of FIG. 14, drops the host vehicle icon V1 onto the nearby vehicle icon V2.

Accordingly, a following instruction command issued, and as shown in (c) of FIG. 14, a following icon F1 indicating that the host vehicle is in traveling following the nearby vehicle is displayed at a position between the host vehicle icon V1 and the nearby vehicle icon V2. The following icon F1 may be an icon representing a linking state of the host vehicle and the nearby vehicle such as a spring or a string, or an arrow pointing two parties, or may be a character description such as following traveling. The following icon F1 may be displayed at a position other than a position between the host vehicle icon and the nearby vehicle icon. As a gesture operation for issuing the following instruction command, other than the above operation, an operation that links the host vehicle icon and the nearby vehicle icon may be used.

Figure 15:
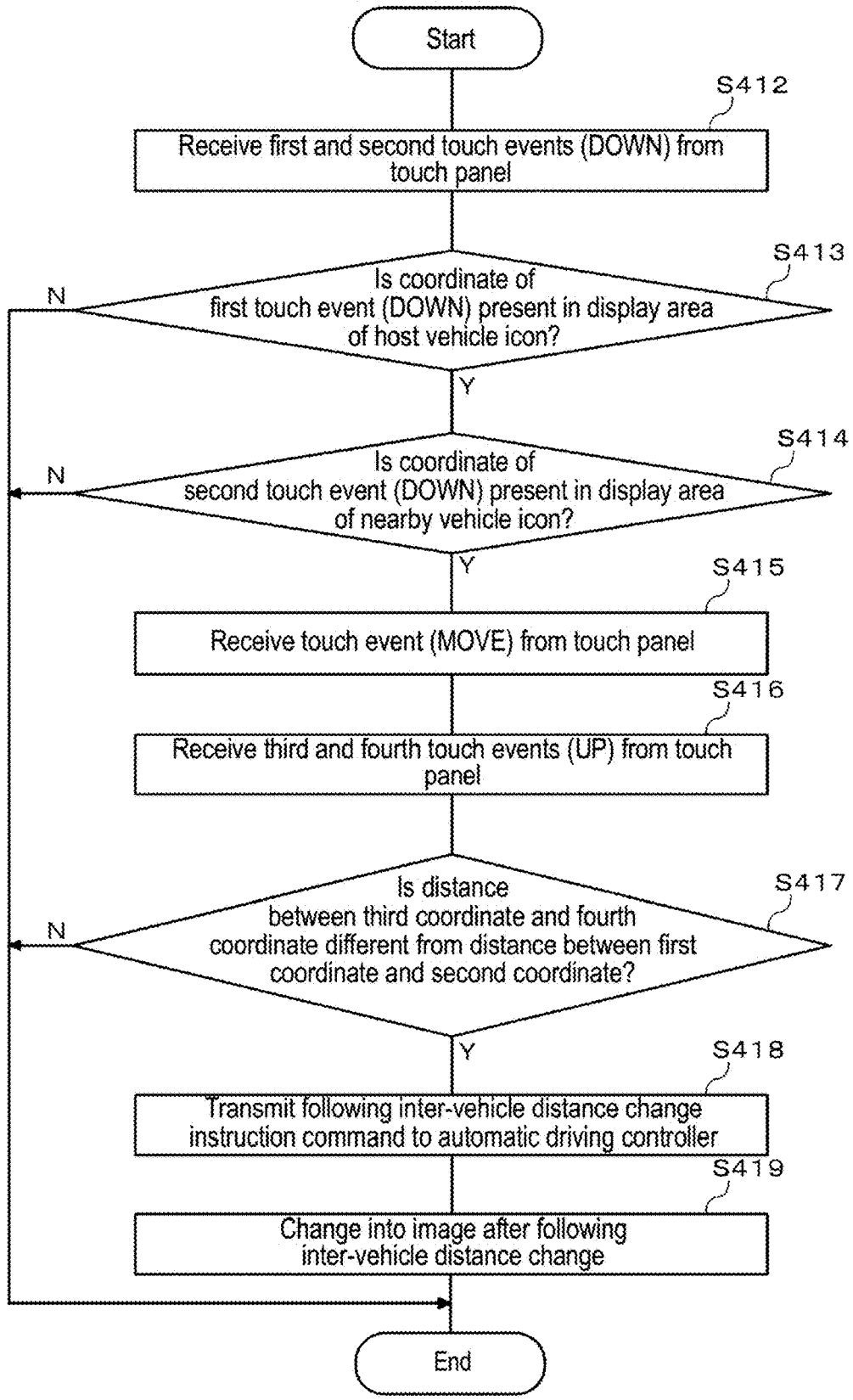
FIG. 15 is a flowchart illustrating an example of a gesture operation that touches two points on a host vehicle icon and a nearby vehicle icon and pinches in/pinches out a distance between the host vehicle icon and the nearby vehicle icon during following traveling.

FIG. 15 is a flowchart illustrating an example of a gesture operation that touches two points on the host vehicle icon and the nearby vehicle icon and pinches in/pinches out a distance between the host vehicle icon and the nearby vehicle icon during following traveling. Determination unit 11 of HMI controller 10 receives a two-point touch event (DOWN) from the touch panel (S412). Determination unit 11 determines whether or not a coordinate detected by a first touch event (DOWN) is present in a display area of the host vehicle icon (S413). In a case where the coordinate detected by the first touch event (DOWN) is present outside the display area of the host vehicle icon (N in S413), it is determined that the gesture operation is not an inter-vehicle distance change instruction, and the process ends.

In a case where the coordinate detected by the first touch event (DOWN) is present in the display area of the host vehicle icon (Y in S413), determination unit 11 determines whether or not a coordinate detected by a second touch event (DOWN) is present in a display area of the nearby vehicle icon (S414). In a case where the coordinate detected by the second touch event (DOWN) is present outside the display area of the nearby vehicle icon (N in S414), it is determined that the gesture operation is not an inter-vehicle distance change instruction, and the process ends.

In a case where the coordinate detected by the second touch event (DOWN) is present in the display area of the nearby vehicle icon (Y in S414), determination unit 11 receives a touch event (MOVE) from the touch panel (S415). Then, determination unit 11 receives a two-point touch event (UP) from the touch panel (S416). Determination unit 11 compares the distance between a third coordinate and a fourth coordinate detected by the touch event (UP) and the distance between a first coordinate and a second coordinate detected by the touch event (DOWN) (S417). In a case where the two distances are different from each other (Y in S417), instruction unit 13 issues a following inter-vehicle distance change instruction command for changing the distance between the host vehicle and the nearby vehicle in following traveling to automatic driving controller 20 (S418). Image generation unit 12 changes the inter-vehicle distance between the host vehicle icon and the nearby vehicle icon in the schematic diagram (S419). In a case where the two distances are the same (N in S417), it is determined that the gesture operation is not an inter-vehicle distance change instruction, and the process ends.

Figure 16:
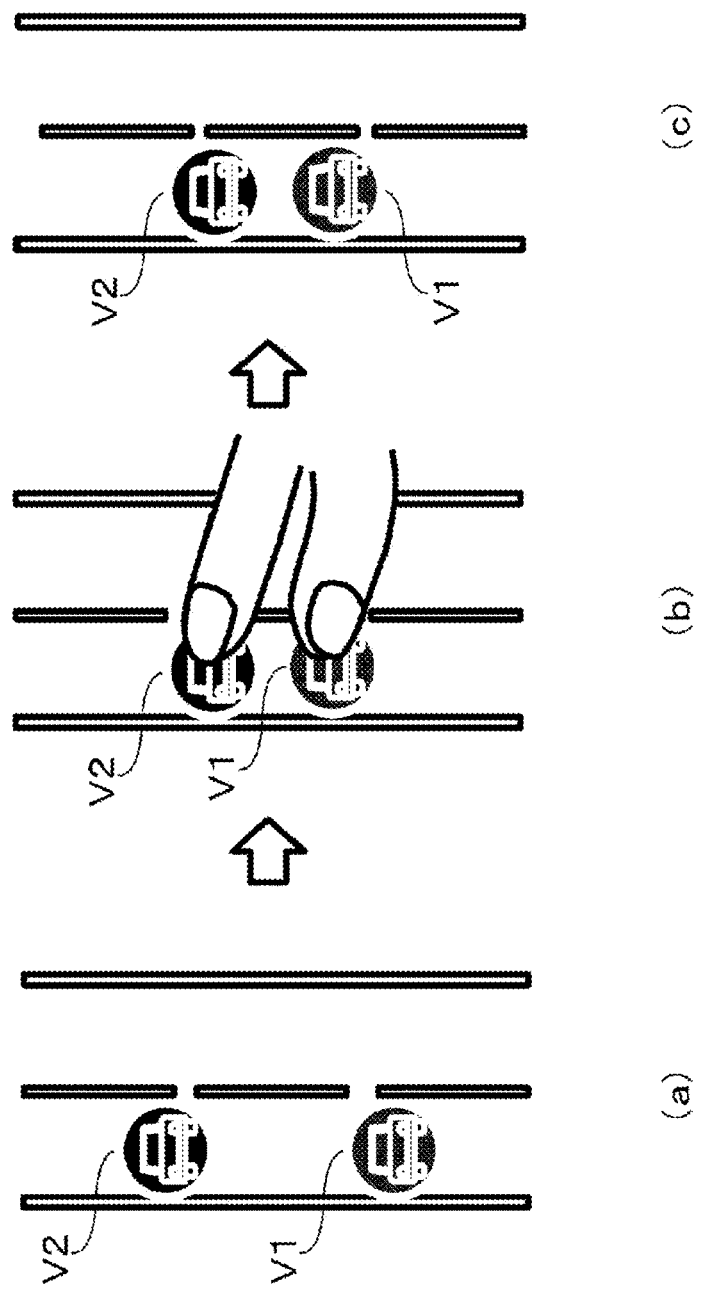
FIG. 16 is a diagram illustrating an example of a gesture operation according to the flowchart of FIG. 15.

FIG. 16 is a diagram illustrating an example of a gesture operation according to the flowchart of FIG. 15. In a case where a driver is about to change the inter-vehicle distance between the host vehicle and the nearby vehicle in following traveling, as illustrated in (a) of FIG. 16, a driver touches the host vehicle icon V1 and the nearby vehicle icon V2 with two fingers. In this state, as illustrated in (b) of FIG. 16, when a driver pinches in the inter-vehicle distance, an inter-vehicle distance change instruction command for shortening the inter-vehicle distance between the host vehicle and the nearby vehicle is issued. The inter-vehicle distance after change is determined according to the distance between the host vehicle icon V1 and the nearby vehicle icon V2. In (c) of FIG. 16, a schematic diagram after the inter-vehicle distance changes is illustrated, and the inter-vehicle distance between the host vehicle icon V1 and the nearby vehicle icon V2 (a) is shorten, compared to the inter-vehicle distance in (a) of FIG. 16. In a state where a driver touches the host vehicle icon V1 and the nearby vehicle icon V2 with two fingers, when a driver pinches out the inter-vehicle distance between the host vehicle icon V1 and the nearby vehicle icon V2, an inter-vehicle distance change instruction command for increasing the inter-vehicle distance between the host vehicle and the nearby vehicle is issued. As a gesture operation for issuing the inter-vehicle distance change instruction command, an operation with one finger other than the pinch operation with two fingers may be used, and an operation for changing the distance between the host vehicle icon and the nearby vehicle icon may be used.

Figure 17:
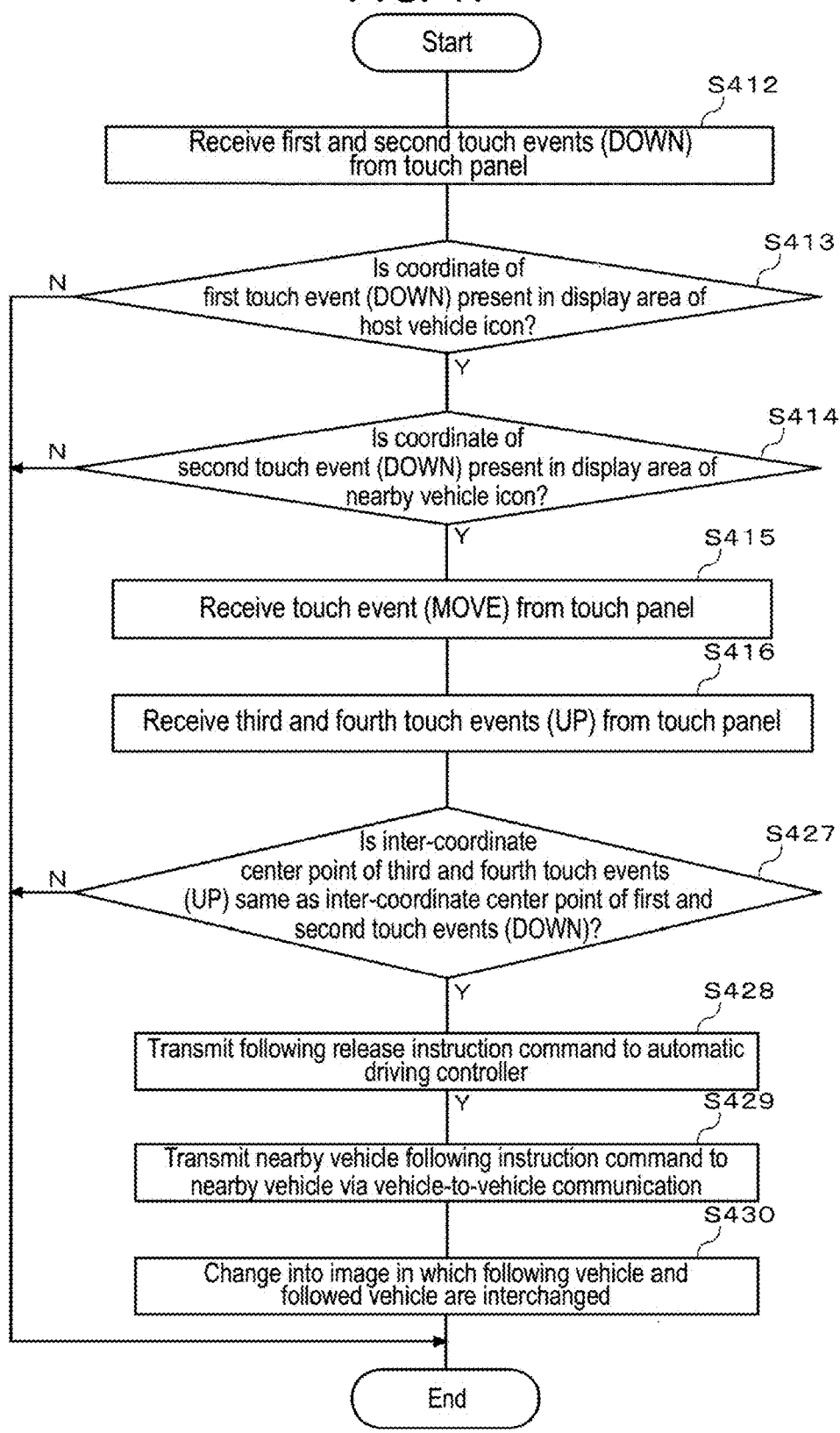
FIG. 17 is a flowchart illustrating an example of a gesture operation that touches two points on a host vehicle icon and a nearby vehicle icon and rotates the two points during following traveling.

FIG. 17 is a flowchart illustrating an example of a gesture operation that touches two points on a host vehicle icon and a nearby vehicle icon and rotates the two points during following traveling. Processes from step S412 to step S416 are the same as those of the flowchart of FIG. 15. Determination unit 11 determines whether or not the center point between a third coordinate and a fourth coordinate detected by the touch event (UP) is the same as the center point between a first coordinate and a second coordinate detected by the touch event (DOWN) (S427). In a case where the center point between the third coordinate and the fourth coordinate is the same as the center point between the first coordinate and the second coordinate (Y in S427), instruction unit 13 issues a following release instruction command for releasing following traveling in which the host vehicle is traveling following the nearby vehicle to automatic driving controller 20 (S428). At this time, instruction unit 13 transmits a nearby vehicle following instruction command for instructing the nearby vehicle to follow the host vehicle to the nearby vehicle via vehicle-to-vehicle communication (S429). The nearby vehicle following instruction command may be transmitted to the nearby vehicle via a relay device. Image generation unit 12 interchanges the host vehicle (following vehicle) icon and the nearby vehicle (followed vehicle) icon in the schematic diagram (S430). In a case where positions of the two center points are different from each other in step S427 (N in S427), it is determined that the gesture operation is not following traveling vehicle interchange instruction, and the process ends.

Figure 18:
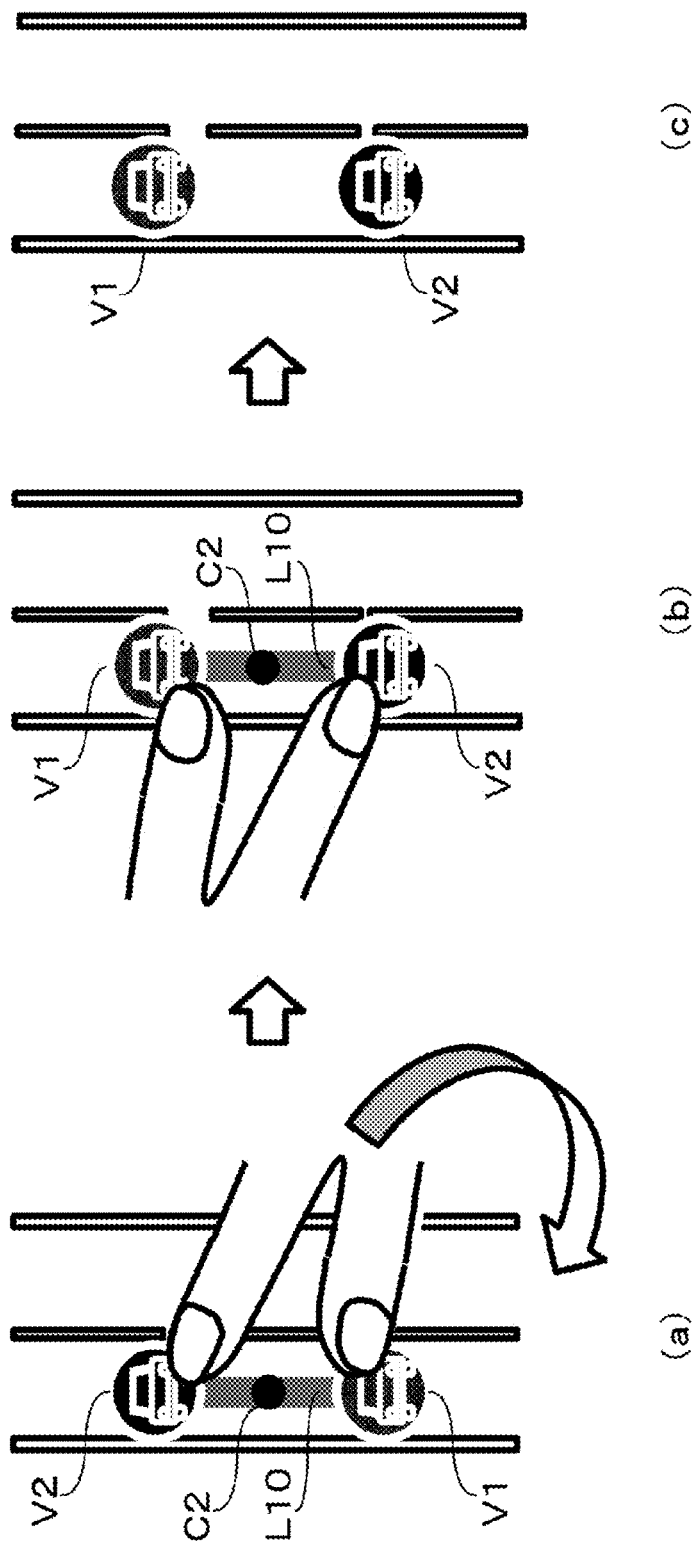
FIG. 18 is a diagram illustrating an example of a gesture operation according to the flowchart of FIG. 17.

FIG. 18 is a diagram illustrating an example of a gesture operation according to the flowchart of FIG. 17. In a case where a driver is about to interchange positions of the host vehicle and the nearby vehicle in following traveling, as illustrated in (a) of FIG. 18, a driver touches the host vehicle icon V1 and the nearby vehicle icon V2 with two fingers. In this state, as illustrated in (b) of FIG. 18, a driver rotates the two fingers so as to interchange the host vehicle icon V1 and the nearby vehicle icon V2. Accordingly, a command for interchanging the positions of the host vehicle and the nearby vehicle in following traveling is issued. In (c) of FIG. 18, a schematic diagram after vehicle interchange is illustrated, and the positions of the host vehicle icon V1 and the nearby vehicle icon V2 are reversed compared to the positions in (a) of FIG. 18. In (a) of FIG. 18 and (b) of FIG. 18, an imaginary line L10 and a center point C2 between the host vehicle icon V1 and the nearby vehicle icon V2 are displayed in the schematic diagram, but an example in which the imaginary line L10 and the center point C2 are not displayed may be also employed. The order of following traveling is periodically interchanged, and thus it is possible to equalize fuel consumption in the host vehicle and the nearby vehicle. In order to issue a following release instruction command, other than the above operation, an operation that cancels the link between the host vehicle icon and the nearby vehicle icon may be used. As a gesture operation that issues a following relationship change instruction command, other than the above operation, an operation that interchanges the following relationship between the host vehicle icon and the nearby vehicle icon may be used. The host vehicle icon and the nearby vehicle icon may be interchanged by displaying an interchange button in the host vehicle icon or the nearby vehicle icon or between the host vehicle icon and the nearby vehicle icon, and pressing the interchange button. After a following relationship is set, automatic driving controller 20 may periodically perform interchange control.

Figure 19:
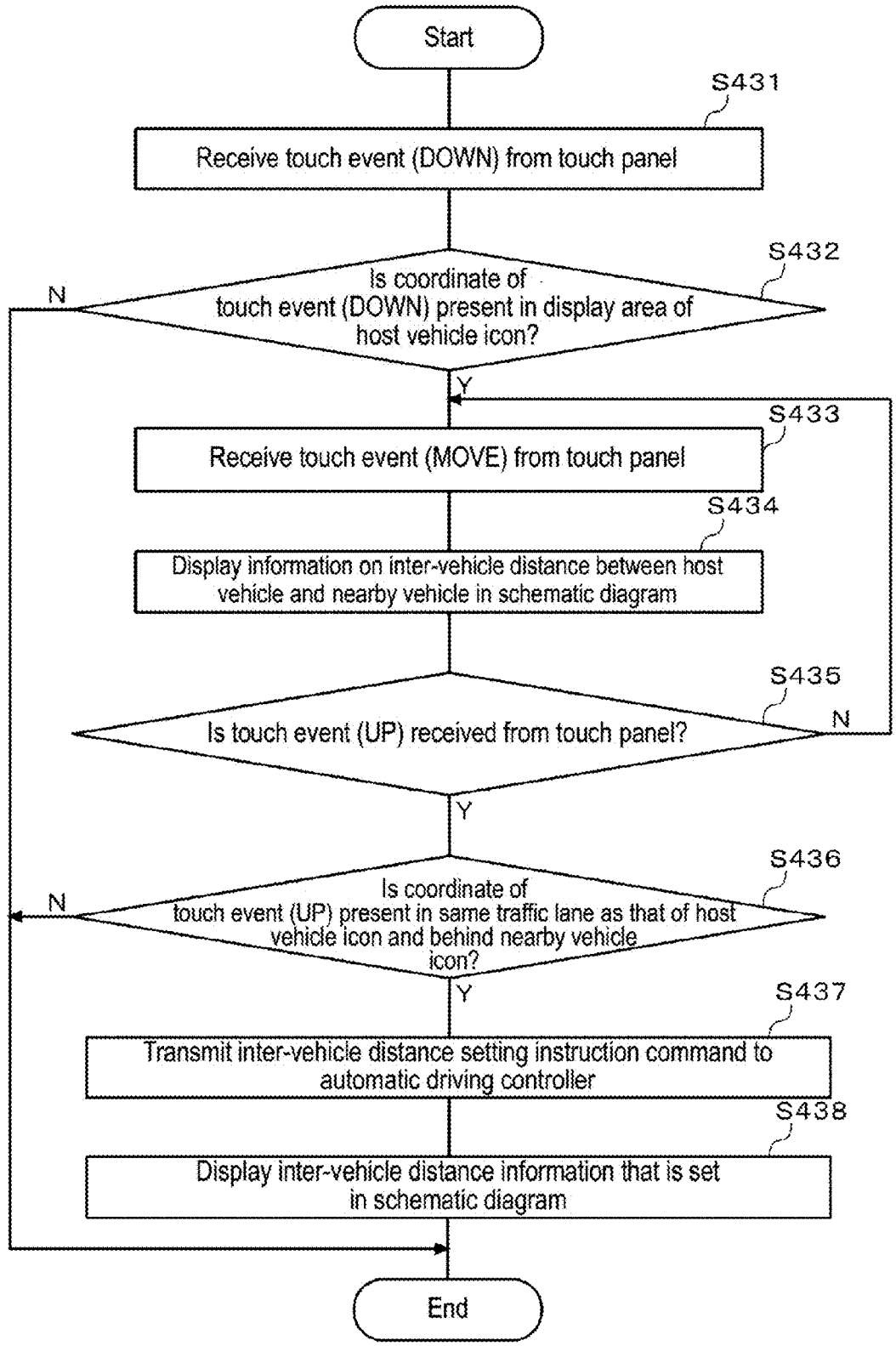
FIG. 19 is a flowchart illustrating an example of a gesture operation for swiping a host vehicle icon.

FIG. 19 is a flowchart illustrating an example of a gesture operation that swipes a host vehicle icon. Determination unit 11 of HMI controller 10 receives a touch event (DOWN) from the touch panel (S431). Determination unit 11 determines whether or not a coordinate detected by the touch event (DOWN) is present in a display area of the host vehicle icon (S432). In a case where the coordinate detected by the touch event (DOWN) is present outside the display area of the host vehicle icon (N in S432), it is determined that the gesture operation is not an inter-vehicle distance setting instruction, and the process ends.

In a case where the coordinate detected by the touch event (DOWN) is present in the display area of the host vehicle icon (Y in S432), determination unit 11 receives a touch event (MOVE) from the touch panel (S433). Image generation unit 12 displays the inter-vehicle distance between the host vehicle and the nearby vehicle in the schematic diagram (S434). During a period for which a touch event (UP) is not received from the touch panel (N in S435), the process transitions to step S433, and reception of a touch event (MOVE) and display of the inter-vehicle distance information are continued (S433 and S434). That is, as the distance between the host vehicle icon and the nearby vehicle icon is changed, image generation unit 12 updates the inter-vehicle distance information in the schematic diagram in real time.

When a touch event (UP) is received from the touch panel (Y in S435), determination unit 11 determines whether or not a coordinate detected by the touch event (UP) is present in the same traffic lane as that of the host vehicle icon and behind the nearby vehicle icon (S436). In a case where the coordinate detected by the touch event (UP) is present in the same traffic lane as that of the host vehicle icon and behind the nearby vehicle icon (Y in S436), instruction unit 13 issues an inter-vehicle distance setting instruction command for setting an inter-vehicle distance according to the distance between the host vehicle icon and the nearby vehicle icon to automatic driving controller 20 (S437). Image generation unit 12 displays the inter-vehicle distance information that is set in the schematic diagram (S438). In a case where the coordinate detected by the touch event (UP) is not present in the same traffic lane as that of the host vehicle icon and behind the nearby vehicle icon (N in S436), it is determined that the gesture operation is not an inter-vehicle distance setting instruction, and the process ends.

Figure 20:
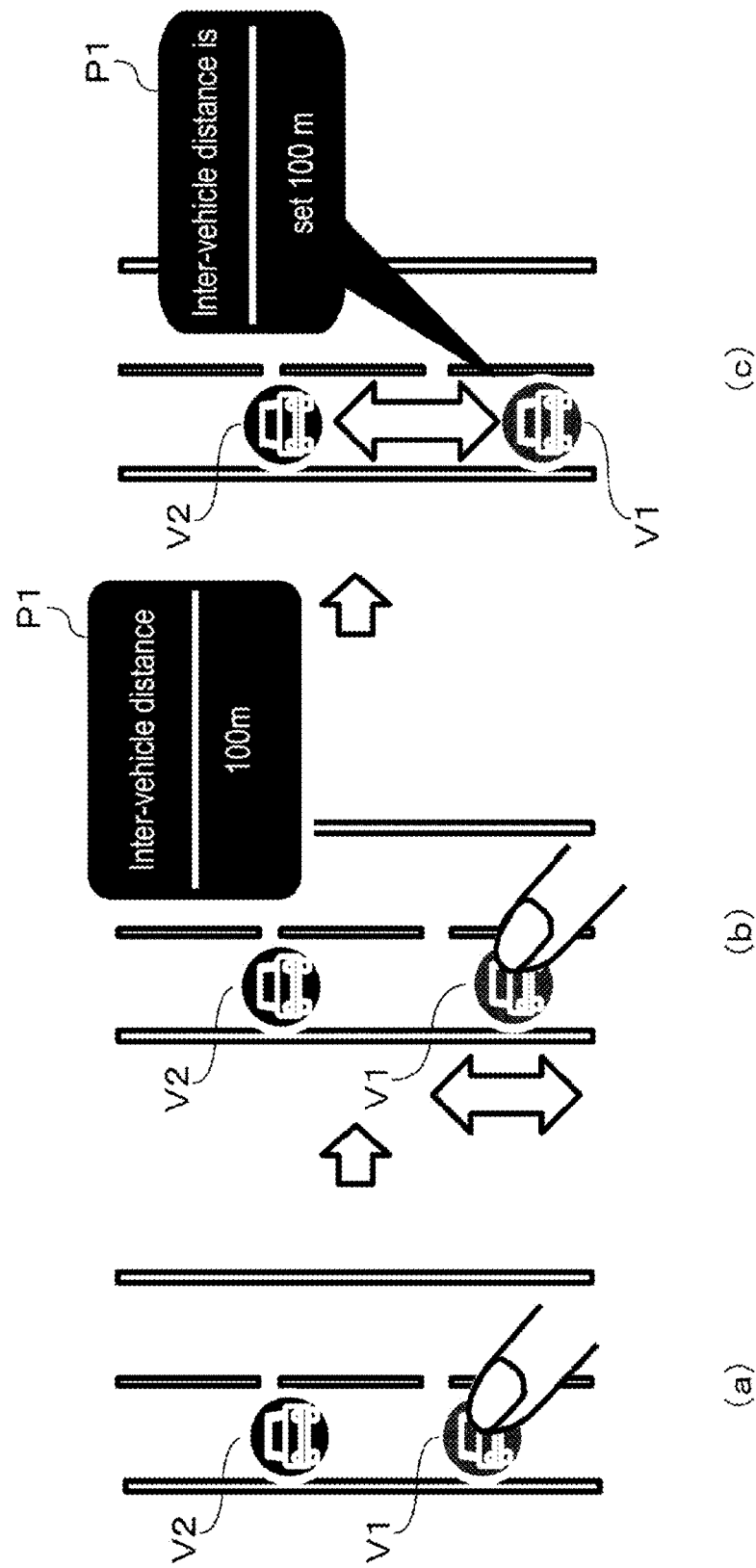
FIG. 20 is a diagram illustrating an example of a gesture operation according to the flowchart of FIG. 19.

FIG. 20 is a diagram illustrating an example of a gesture operation according to the flowchart of FIG. 19. As illustrated in (a) of FIG. 20, in a case where a driver is about to set an inter-vehicle distance between the host vehicle and the nearby vehicle, as illustrated in (b) of FIG. 20, a driver upwardly or downwardly swipes the host vehicle icon V1. During swiping, a pop-up window P1 for displaying an inter-vehicle distance is displayed. As illustrated in (c) of FIG. 20, when swiping is completed, an inter-vehicle distance setting instruction command is issued. A message indicating that an inter-vehicle distance is set is displayed in the pop-up window P1, and then the pop-up window P1 is deleted.

Figure 21:
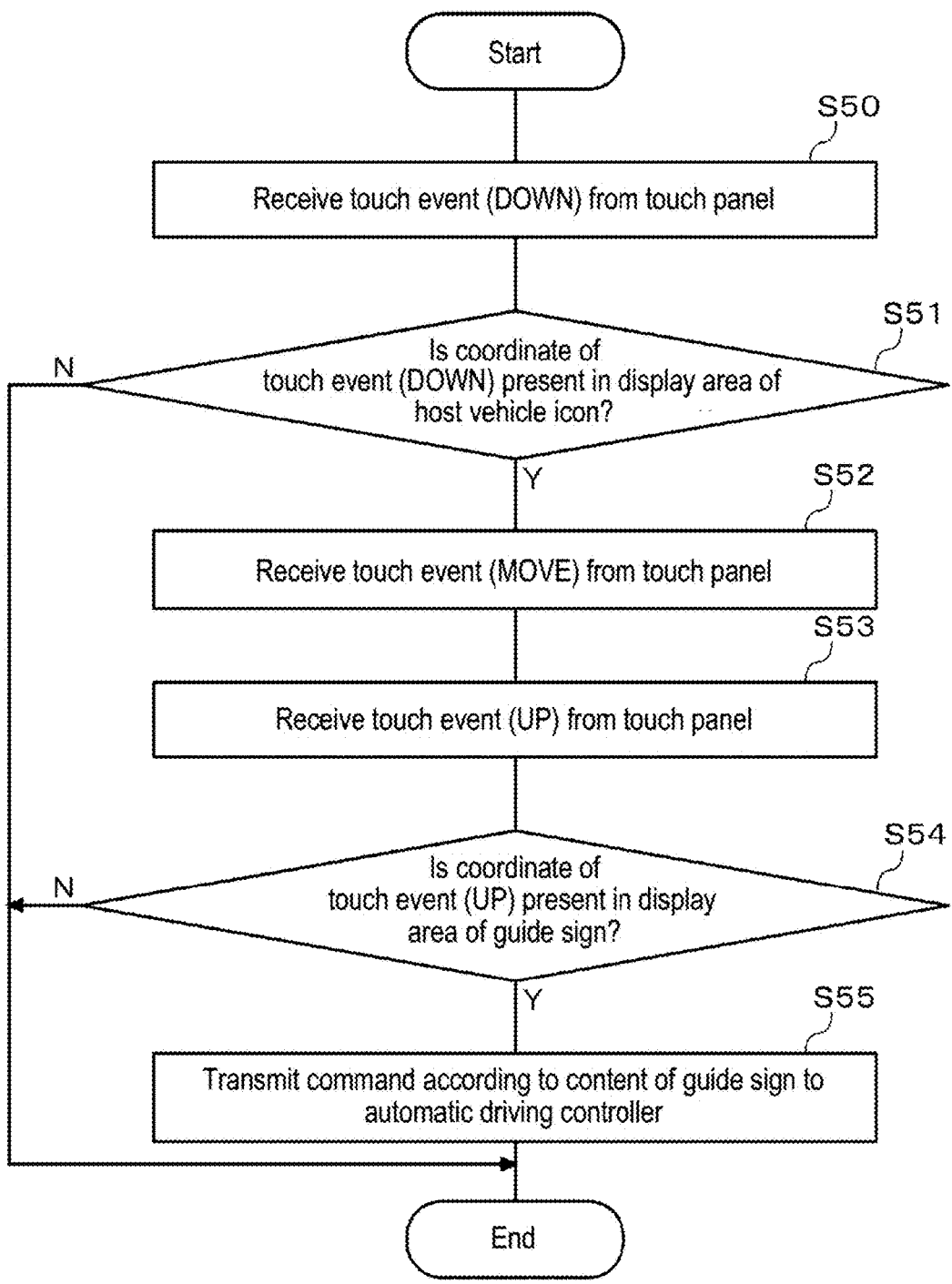
FIG. 21 is a flowchart illustrating an example of dragging and dropping a host vehicle icon onto a specific area (a road guide sign).

FIG. 21 is a flowchart illustrating an example of dragging and dropping a host vehicle icon onto a specific area (a road guide sign). Determination unit 11 of HMI controller 10 receives a touch event (DOWN) from the touch panel (S50). Determination unit 11 determines whether or not a coordinate detected by the touch event (DOWN) is present in a display area of the host vehicle icon (S51). In a case where the coordinate detected by the touch event (DOWN) is present outside the display area of the host vehicle icon (N in S51), it is determined that the gesture operation is not an operation instruction according to the content of the road guide sign, and the process ends.

In a case where the coordinate detected by the touch event (DOWN) is present in the display area of the host vehicle icon (Y in S51), determination unit 11 receives a touch event (MOVE) from the touch panel (S52). Then, determination unit 11 receives a touch event (UP) from the touch panel (S53).

Determination unit 11 determines whether or not a coordinate detected by the touch event (UP) is present in a display area of the road guide sign (S54). In a case where the coordinate detected by the touch event (UP) is present in the display area of the road guide sign (Y in S54), instruction unit 13 issues a command according to the content of the road guide sign to automatic driving controller 20 (S55). In a case where the coordinate detected by the touch event (UP) is present outside the display area of the road guide sign (N in S54), it is determined that the gesture operation is not an operation instruction according to the content of the road guide sign, and the process ends.

Figure 22:
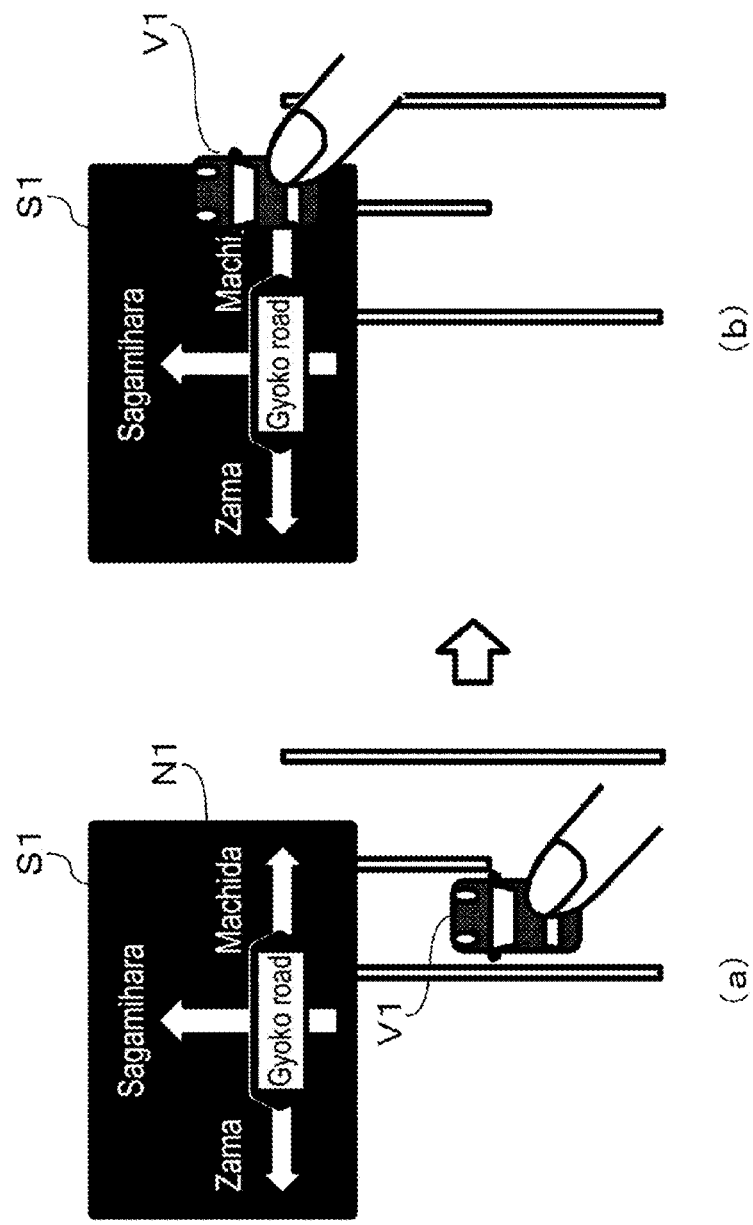
FIG. 22 is a diagram illustrating an example of a gesture operation according to the flowchart of FIG. 21.

FIG. 22 is a diagram illustrating an example of a gesture operation according to the flowchart of FIG. 21. In a case where a driver is about to change a course of the host vehicle to any one of courses displayed on a destination guide sign S1 at an intersection, as illustrated in (a) of FIG. 22, a driver drags the host vehicle icon V1, and as illustrated in (b) of FIG. 22, drops the host vehicle icon V1 onto a place name "Machida" N1 of a desired destination in the destination guide sign S1. Accordingly, a route change instruction command for changing a course of the host vehicle to a route in which the desired destination is set as a passing spot or a destination is issued.

Hereinafter, returning to FIG. 5, the details of processing for drawing a predicted trajectory/route candidate in step S9e will be described.

Figure 23:
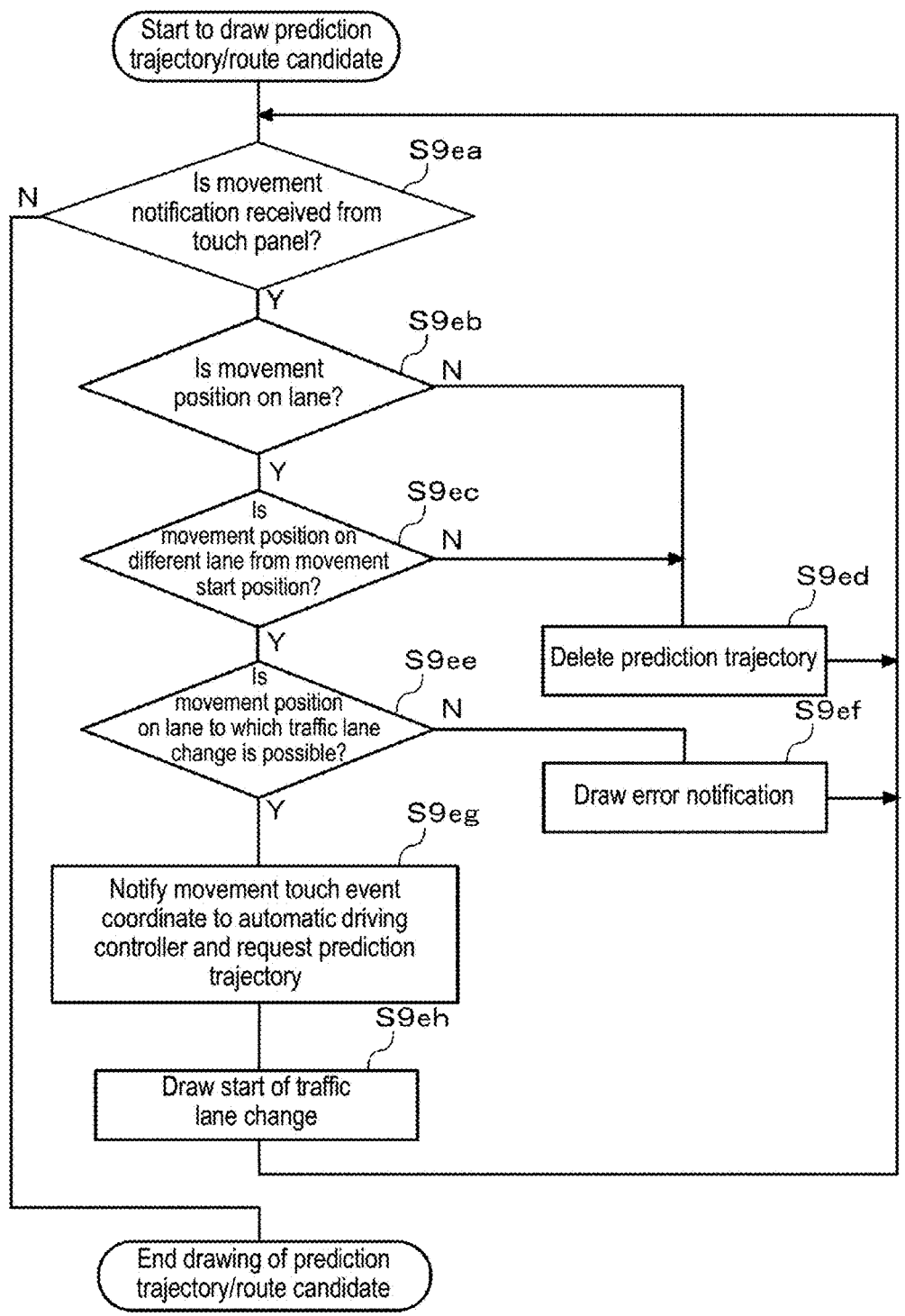
FIG. 23 is a flowchart illustrating an example of processing for drawing a predicted trajectory/route candidate in step S9e of FIG. 5.

FIG. 23 is a flowchart illustrating an example of processing for drawing a predicted trajectory/route candidate in step S9e of FIG. 5. Determination unit 11 of HMI controller 10 determines whether or not a movement notification of a host vehicle icon is received from the touch panel (S9ea). In a case where the movement notification of a host vehicle icon is received (Y in S9ea), determination unit 11 determines whether or not a movement position of the host vehicle icon is on a lane (S9eb). In a case where the movement position of the host vehicle icon is on a lane (Y in S9eb), determination unit 11 determines whether or not the movement position of the host vehicle icon is on a different lane from a lane on which a movement start position of the host vehicle icon is present (S9ec). In a case where the movement position of the host vehicle icon is not on a different lane from a lane on which a movement start position of the host vehicle icon is present (in a case where the movement position of the host vehicle icon is on the same lane as a lane on which a movement start position of the host vehicle icon is present) (N in S9*ec*), image generation unit 12 deletes a predicted trajectory in the schematic diagram displayed on the touch panel (S9*ed*). In step S9*eb*, even in a case where the movement position of the host vehicle icon is not on a lane (N in S9*eb*), image generation unit 12 deletes a predicted trajectory in the schematic diagram displayed on the touch panel (S9*ed*).

In step S9*ec*, in a case where the movement position of the host vehicle icon is on a different lane from a lane on which the movement start position of the host vehicle icon is present (Y in S9*ec*), determination unit 11 determines whether or not the movement position of the host vehicle icon is on a lane to which traffic lane change is possible (S9*ee*). In a case where the movement position of the host vehicle icon is not on a lane to which traffic lane change is possible (N in S9*ee*), image generation unit 12 draws an error notification on the touch panel (S9*ef*). In a case where the movement position of the host vehicle icon is on a lane to which traffic lane change is possible (Y in S9*ee*), instruction unit 13 notifies a coordinate of the touch event on the host vehicle icon to automatic driving controller 20, and requests a predicted trajectory (S9*eg*). Image generation unit 12 draws the predicted trajectory of traffic lane change that is acquired from automatic driving controller 20 on the touch panel (S9*eb*). Until the movement notification of the host vehicle icon is not received from the touch panel (N in S9*ea*), the above processing continues.

Figure 24:
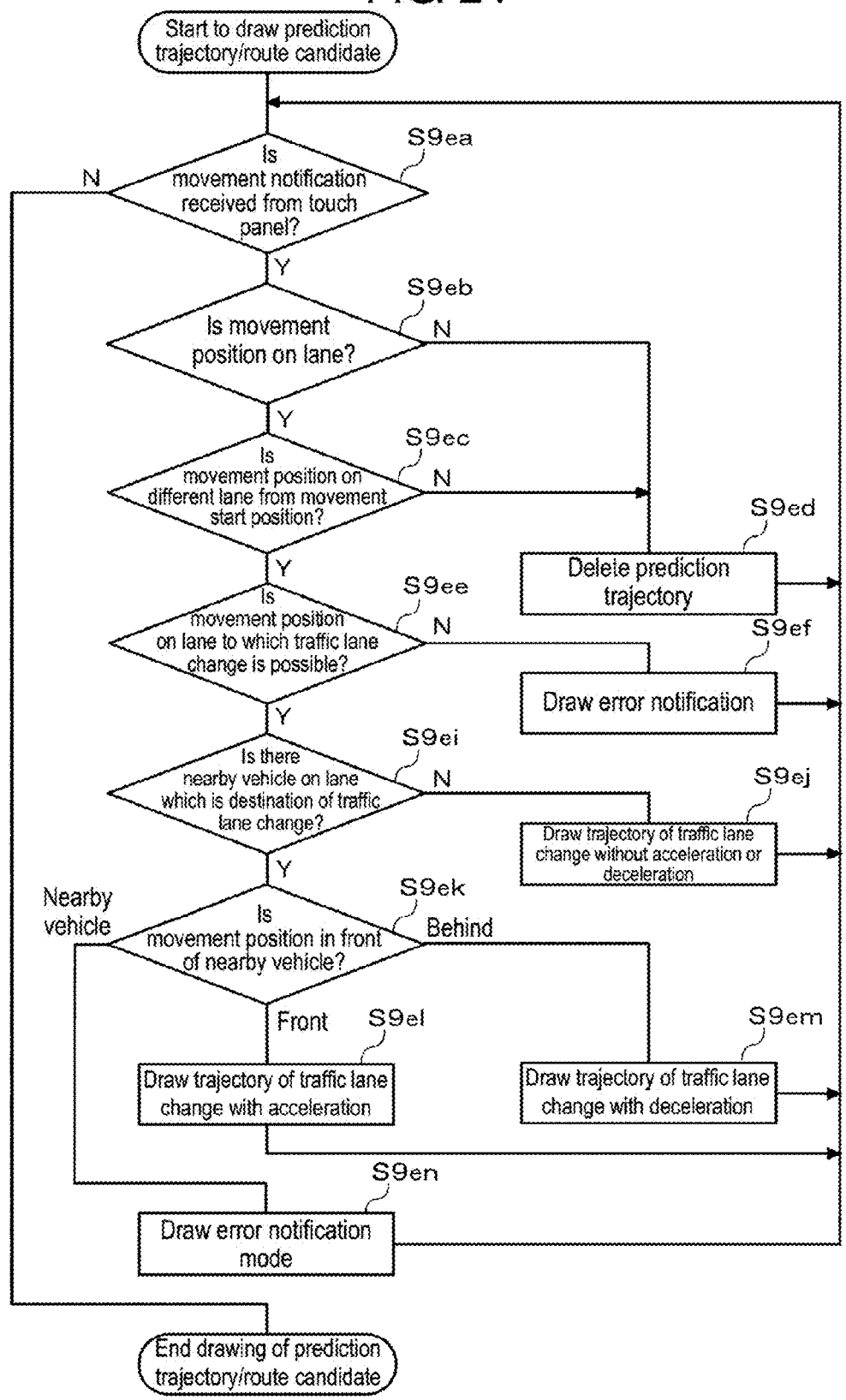
FIG. 24 is a flowchart illustrating another example of processing for drawing a predicted trajectory/route candidate in step S9e of FIG. 5.

FIG. 24 is a flowchart illustrating another example of processing for drawing a predicted trajectory/route candidate in step S9*e* of FIG. 5. Processes from step S9*ea* to step S9*ef* are the same as those of the flowchart of FIG. 23. In a case where the movement position of the host vehicle icon is on a lane to which traffic lane change is possible (Y in S9*ee*), determination unit 11 determines whether or not there is a nearby vehicle on a lane which is a destination of traffic lane change (S9*ei*). In a case where there is no nearby vehicle on a lane which is a destination of lane change (N in S9*ei*), image generation unit 12 draws a predicted trajectory of traffic lane change without acceleration or deceleration on the touch panel (S9*ej*).

In a case where there is a nearby vehicle on a lane which is a destination of traffic lane change (Y in S9*ei*), determination unit 11 determines whether or not the movement position of the host vehicle icon is in front of or behind the nearby vehicle icon (S9*ek*). In a case where the movement position of the host vehicle icon is in front of the nearby vehicle icon (front in S9*ek*), image generation unit 12 draws a predicted trajectory of traffic lane change with acceleration on the touch panel (S9*el*). In a case where the movement position of the host vehicle icon is behind the nearby vehicle icon (behind in S9*ek*), image generation unit 12 draws a predicted trajectory of traffic lane change with deceleration on the touch panel (S9*em*). In a case where the movement position of the host vehicle icon is in the nearby vehicle icon (nearby vehicle in S9*ek*), image generation unit 12 draws an error notification mode on the touch panel (S9*en*). Until the movement notification of the host vehicle icon is not received from the touch panel (N in S9*ea*), the above processing continues.

Figure 25C:
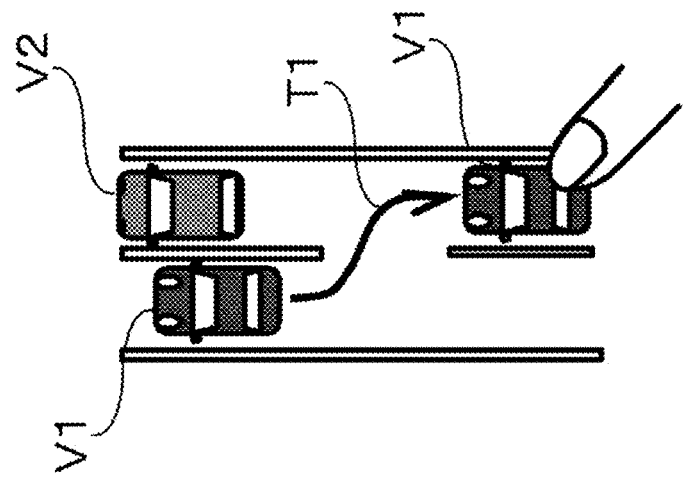
FIG. 25C is a diagram illustrating an example of a gesture operation according to the flowchart of FIG. 24.
Figure 25B:
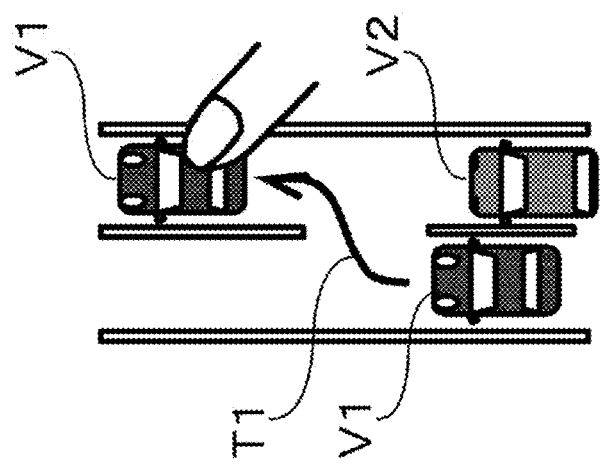
FIG. 25B is a diagram illustrating an example of a gesture operation according to the flowchart of FIG. 24.
Figure 25A:
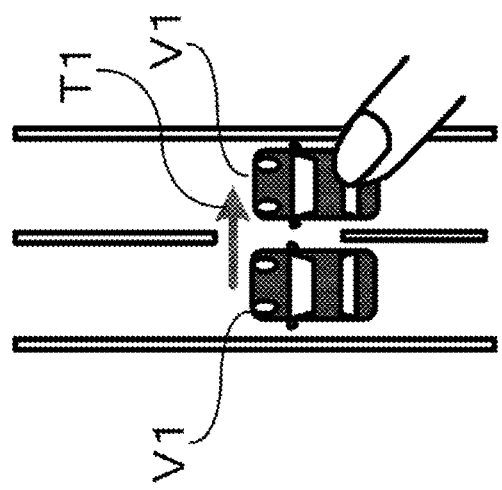
FIG. 25A is a diagram illustrating an example of a gesture operation according to the flowchart of FIG. 24.

FIG. 25A to FIG. 25C are diagrams illustrating an example of a gesture operation according to the flowchart of FIG. 24. FIG. 25A is an example of a predicted trajectory of traffic lane change without acceleration and deceleration in step S9*ej*. FIG. 25B is an example of a predicted trajectory of traffic lane change with acceleration in step S9*el*. FIG. 25C is an example of a predicted trajectory of traffic lane change with deceleration in step S9*em*.

FIG. 26 is a diagram illustrating an example of an error display screen. In a case where a driver is about to change the traffic lane of the host vehicle from the first lane L1 to the second lane L2, as illustrated in (a) of FIG. 26, a driver drags the host vehicle icon V1 on the first lane L1, and as illustrated in (b) of FIG. 26, drops the host vehicle icon V1 onto the second lane L2. In a case where an approach of a nearby vehicle to the dropped position of the host vehicle icon is detected, as illustrated in (c) of FIG. 26, an error message "The lane change is canceled because of a following vehicle." is displayed in the pop-up window P1, and the host vehicle icon V1 is returned to the first lane L1.

Figure 27:
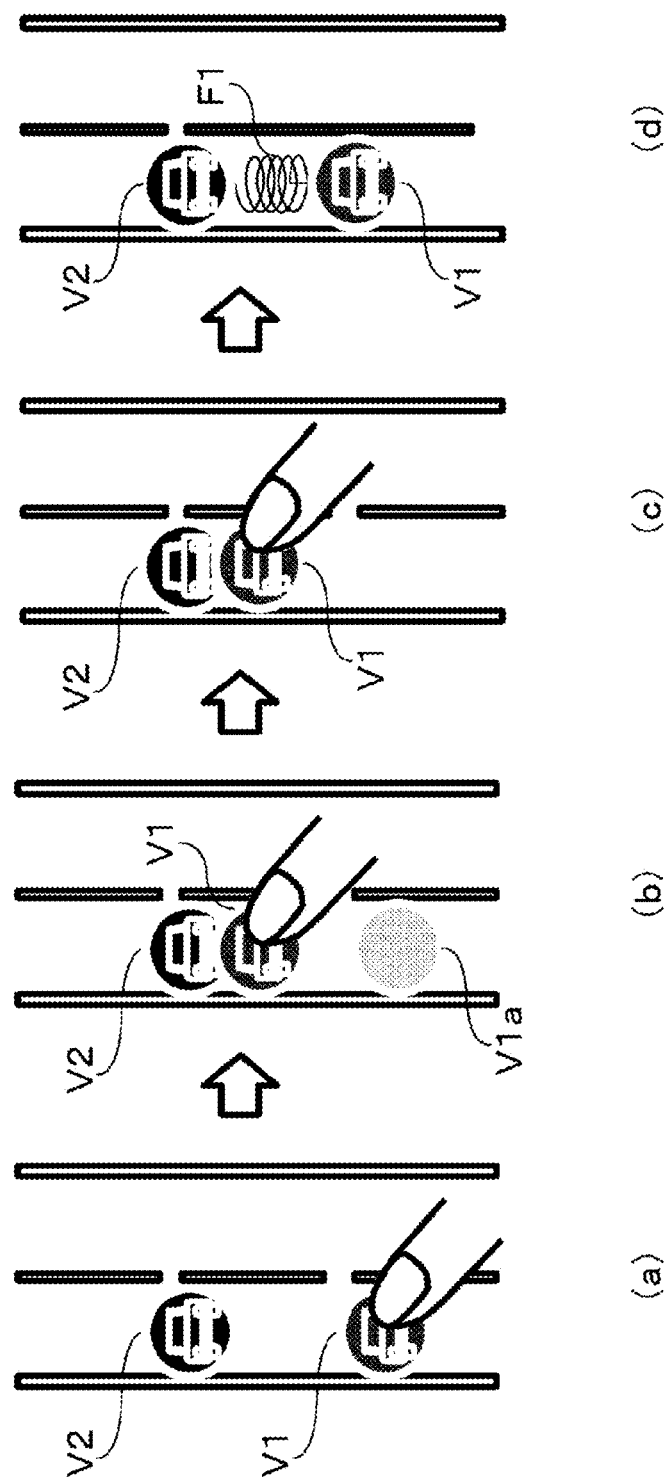
FIG. 27 is a diagram illustrating a display example during a period for which a host vehicle icon is dragged and dropped onto a nearby vehicle icon.

FIG. 27 is a diagram illustrating a display example during a period for which a host vehicle icon V1 is dragged and dropped onto a nearby vehicle icon V2. In a case where a driver is about the host vehicle to travel following the nearby vehicle, as illustrated in (a) of FIG. 27, a driver drags the host vehicle icon V1. During the period for which the host vehicle icon V1 is dragged and dropped onto the nearby vehicle icon V2, as illustrated in (b) of FIG. 27, an afterimage V1*a* (a circle mark with a dotted line, or the like) is displayed at the original position of the host vehicle icon. As illustrated in (c) of FIG. 27, when the host vehicle icon V1 is dropped onto the nearby vehicle icon V2, the afterimage V1*a* is deleted. As illustrated in (d) of FIG. 27, when following traveling is established, a following icon F1 is displayed between the host vehicle icon V1 and the nearby vehicle icon V2.

FIG. 28 is a diagram illustrating another display example during a period for which a host vehicle icon V1 is dragged and dropped onto a nearby vehicle icon V2. In (a) of FIG. 28, an example in which drop areas are displayed in the vicinity of a road area during the period for which the host vehicle icon V1 is dragged and dropped onto the nearby vehicle icon V2 is illustrated. In (a) of FIG. 28, a cancel drop area D1, a rerouting-to-home drop area D2, a left-turn drop area D3, and a right-turn drop area D4 are respectively displayed at up, down, right and left side of the road area. A driver drops the host vehicle icon V1 onto any one of the drop areas D11 to D14, and thus the corresponding operation can be performed. In the drop area, an operation other than the above operation may be displayed, and for example, an operation instruction such as rerouting to a gas station, rerouting to a parking area, rerouting to a service area, passing, traffic lane change, adaptive cruise control (ACC), acceleration and deceleration to a target speed, or the like may be displayed.

In (b) of FIG. 28, an example in which, during the period for which the host vehicle icon V1 is dragged and dropped onto the nearby vehicle icon V2, a color of a background such as a road or the like is changed (inverted, thinned, or the like) and the color of a background is returned to the original color thereof after the dropping is completed is illustrated. In (c) of FIG. 28, an example in which, during the period for which the host vehicle icon V1 is dragged and dropped onto the nearby vehicle icon V2, a movement trajectory T1 being dragged from a drag start position is displayed (a dotted line, or the like) and the trajectory T1 is deleted after the dropping is completed is illustrated.

FIG. 29 is a diagram illustrating a display example of a host vehicle icon V1 being dragged in a case where there is a drop disable area or the like. In a case where a driver is about the host vehicle to travel following the nearby vehicle, as illustrated in (a) of FIG. 29, a driver drags the host vehicle icon V1. After the host vehicle icon V1 is dragged, when there is a drop disable area (a vehicle that is refused to be followed, an opposite traffic lane, or the like) or when a following operation is disabled depending on a situation, the color of the host vehicle icon V1 is changed (inverted, thinned, or the like). In a case where dropping onto a nearby vehicle icon V2 is disabled, as illustrated in (b) of FIG. 29, when the host vehicle icon V1 is dropped onto the nearby vehicle icon V2, as illustrated in (c) of FIG. 29, the host vehicle icon V1 is returned to the original position thereof, and a pop-up window P3 including an error message such as "This is a following operation disable area." is displayed.

FIG. 30A to FIG. 30C are diagrams illustrating another display example of a host vehicle icon V1 being dragged in a case where there is a drop disable area or the like. In FIG. 30A, an example in which, after the host vehicle icon V1 is dragged, when a following operation is disabled, a color of a background such as a road or the like is changed is illustrated. When a following operation is possible, the color of a background is returned to the original color thereof. In FIG. 30B, an example in which, after the host vehicle icon V1 is dragged, a color of a drop disable area is changed (inverted, thinned, or the like) is illustrated. In FIG. 30C, an example in which, after the host vehicle icon V1 is dragged, when there is a drop disable area or when a following operation is disabled, a notification using an error sound or a vibration is performed is illustrated.

FIG. 31 is a diagram illustrating a display example in a case where a drag operation is disabled. In a case where a driver is about the host vehicle to travel following the nearby vehicle, as illustrated in (a) of FIG. 31, at the starting of dragging of the host vehicle icon V1, when a start of an operation is disabled, as illustrated in (b) of FIG. 31, a color of the host vehicle icon V1 is changed and a drag operation (a movement of an icon) is disabled. In addition, a pop-up window P3 including an error message such as "This is a following operation disable area." is displayed.

Figure 32B:
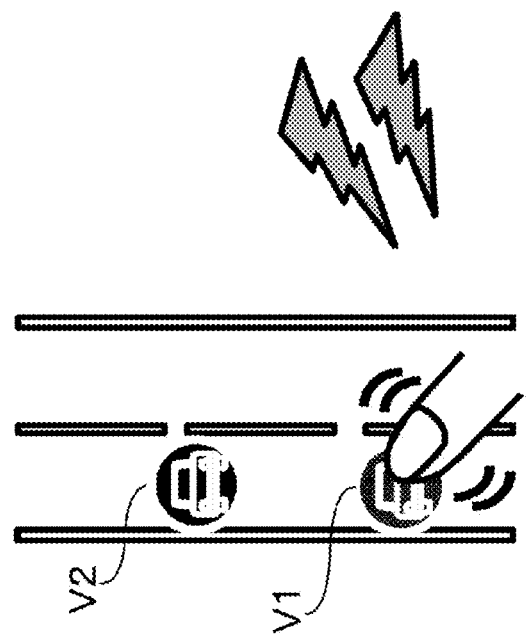
FIG. 32B is a diagram illustrating another display example in a case where a drag operation is disabled.
Figure 32A:
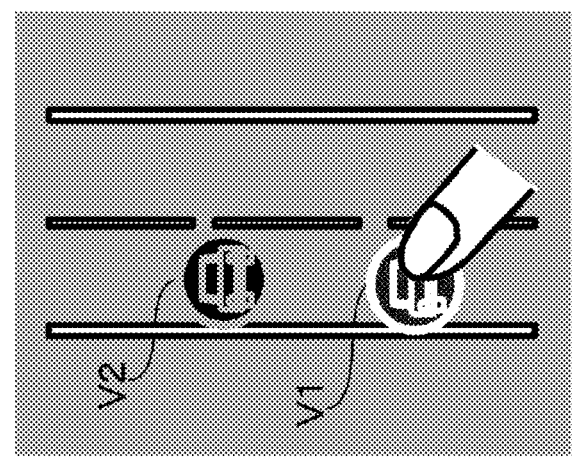
FIG. 32A is a diagram illustrating another display example in a case where a drag operation is disabled.

FIG. 32A and FIG. 32B are diagrams illustrating another display example in a case where a drag operation is disabled. In (a) of FIG. 32, an example in which, at the starting of dragging of the host vehicle icon V1, in a case where a start of an operation is disabled, a color of a background such as a road or the like is changed is illustrated. When a following operation is possible, the color of a background is returned to the original color thereof. In (b) of FIG. 32, an example in which, at the starting of dragging of the host vehicle icon V1, in a case where a start of an operation is disabled, in a state where a drag operation cannot be performed, a notification using an error sound or a vibration is performed is illustrated.

Figure 33:
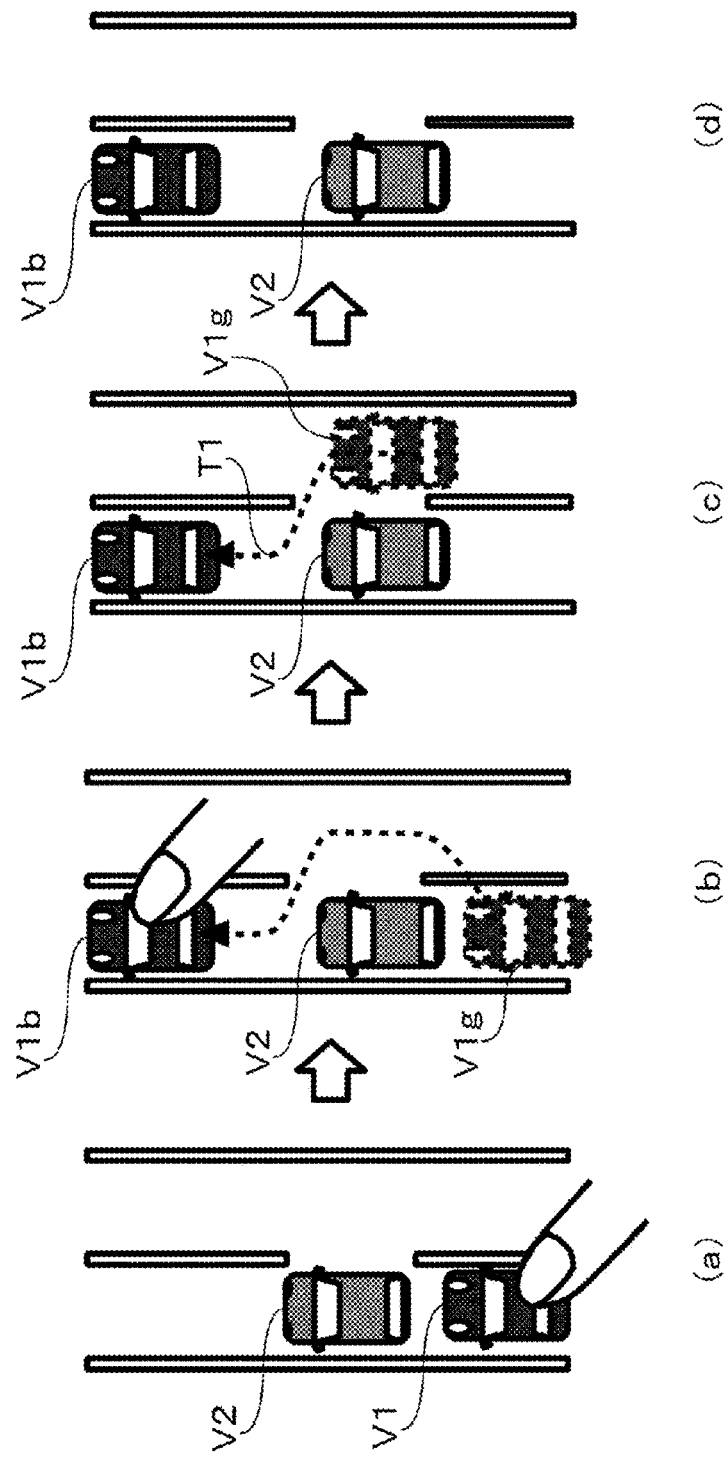
FIG. 33 is a diagram illustrating a first display example of a control being performed while the host vehicle icon is dropped and the host vehicle completes passing.

FIG. 33 is a diagram illustrating a first display example of a host vehicle icon being controlled while the host vehicle icon is dropped and the host vehicle completes passing. In a case where a driver is about to pass a preceding vehicle, as illustrated in (a) of FIG. 33, a driver drags the host vehicle icon V1, and as illustrated in (b) of FIG. 33, drops the host vehicle icon V1 in front of the nearby vehicle icon V2. During a period for which the host vehicle icon V1 is dropped in front of the nearby vehicle icon V2 and the host vehicle completes passing, as illustrated in (c) of FIG. 33, a state (a current position) of the host vehicle is displayed as a ghost icon V1g. A trajectory T1 being moved is also displayed. When passing is completed, as illustrated in (d) of FIG. 33, the ghost icon V1g and the trajectory T1 of the host vehicle are deleted.

Figure 34:
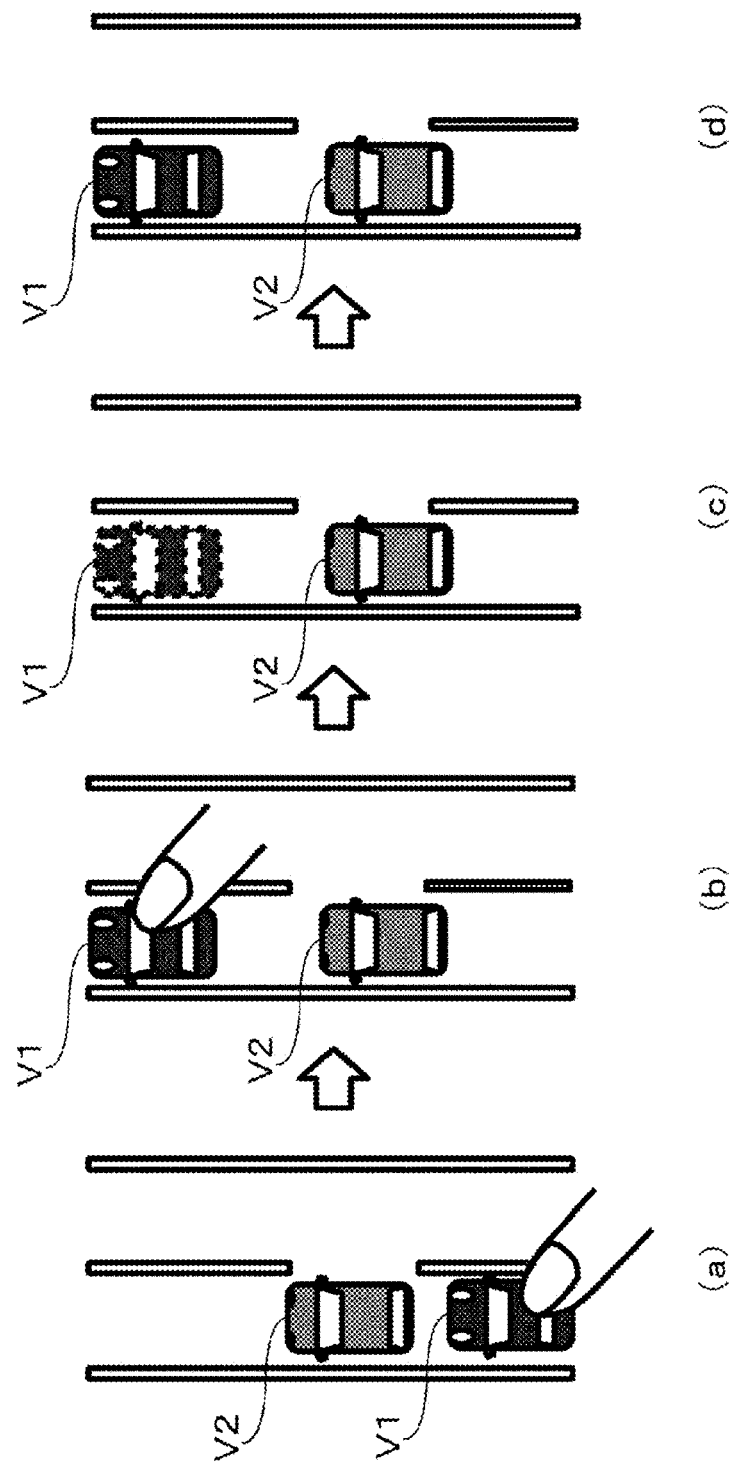
FIG. 34 is a diagram illustrating a second display example of a control being performed while the host vehicle icon is dropped and the host vehicle completes passing.

FIG. 34 is a diagram illustrating a second display example of a host vehicle icon being controlled while the host vehicle icon is dropped and the host vehicle completes passing. In a case where a driver is about to pass a preceding vehicle, as illustrated in (a) of FIG. 34, a driver drags the host vehicle icon V1, and as illustrated in (b) of FIG. 34, drops the host vehicle icon V1 in front of the nearby vehicle icon V2. During the period for which the host vehicle icon V1 is dropped in front of the nearby vehicle icon V2 and the host vehicle completes passing, as illustrated in (c) of FIG. 34, a display state of the host vehicle icon V1 that is a movement target is changed. In (c) of FIG. 34, an example in which the host vehicle icon V1 is flashed is illustrated, but a color change, a size change, a position change, or the like may be performed. When passing is completed, as illustrated in (d) of FIG. 34, the display state of the host vehicle icon V1 is returned to the original display state thereof.

FIG. 35 is a diagram illustrating a third display example of a control being performed while the host vehicle icon is dropped and the host vehicle completes passing. In a case where a driver is about to pass a preceding vehicle, as illustrated in (a) of FIG. 35, a driver drags the host vehicle icon V1, and as illustrated in (b) of FIG. 35, drops the host vehicle icon V1 in front of the nearby vehicle icon V2. During the period for which the host vehicle icon V1 is dropped in front of the nearby vehicle icon V2 and the host vehicle completes passing, a next instruction is queued as an additional operation (control to be performed after completion of a current control is reserved). In (c) of FIG. 35 to (d) of FIG. 35, an example in which traffic lane change is additionally instructed during passing control is illustrated. In this case, although passing control is as follows: traffic lane change to a passing lane → passing a nearby vehicle → traffic lane change to the original traffic lane → traffic lane change to a passing lane, the last two control processes are cancelled out, and thus the passing control is as follows: traffic lane change to a passing lane → passing a nearby vehicle.

FIG. 36 is a diagram illustrating a fourth display example of a control being performed while the host vehicle icon is dropped and the host vehicle completes passing. In a case where a driver is about to pass a preceding vehicle, as illustrated in (a) of FIG. 36, a driver drags the host vehicle icon V1, and as illustrated in (b) of FIG. 36, drops the host vehicle icon V1 in front of the nearby vehicle icon V2. During the period for which the host vehicle icon V1 is dropped in front of the nearby vehicle icon V2 and the host vehicle completes passing, as illustrated in (c) of FIG. 36 and (d) of FIG. 36, in a case where the host vehicle icon V1 is dragged again and dropped the original position thereof, the following processing is performed. When the host vehicle icon V1 is dropped onto the original position thereof, in a case where traffic lane change to a passing lane is being performed or traffic lane change to a passing lane is completed, a command that instructs traffic lane change to the original traffic lane is transmitted. When the host vehicle icon V1 is dropped onto the original position thereof, in a case where the host vehicle is passing the nearby vehicle, in a case where the host vehicle passed the nearby vehicle, or in a case where the host vehicle is in traffic lane change to the original traffic lane, an error message (for example, "Since control is in progress, the operation cannot be performed", "Please wait for a while.", or the like) is displayed.

As described above, according to the present embodiment, it is possible to transfer the contents of various operations to automatic driving controller 20 by moving an icon displayed on the touch panel by a gesture operation. The gesture operation of the icon is a simple operation, and thus a driver is released from a driving operation in the related art such as turning of steering 51, depressing of accelerator pedal 53, or the like. A driver can perform a confirmation of a peripheral situation and an operation instruction on the touch panel at the same time, and thus the sight line of the driver does not move. Accordingly, it is possible to reduce the possibility of an erroneous operation and realize safer driving.

As above, the present invention has been described based on the embodiments. These embodiments have been presented by way of example only, and it should be understood by those skilled in the art that the embodiments can be modified in various forms by combining the respective elements or processing processes, and the modification examples are included in the scope of the present invention.

For example, although an example in which HMI controller 10 is implemented by a dedicated LSI is assumed, functions of HMI controller 10 may be realized using a central processing unit (CPU) in a portable device such as a smart phone or a tablet that is used as display device 30. In this case, a portable device that is used as display device 30 and automatic driving controller 20 are directly connected to each other. Functions of HMI controller 10 may be realized by a CPU in a head unit such as a car navigation device, a display audio, or the like. A dedicated LSI on which HMI controller 10 is mounted may be included in a head unit.

In the embodiments described above, some examples of a gesture operation in which a host vehicle icon is set as a contact start position are described. Hereinafter, including the embodiments described above, examples of a gesture operation in which a host vehicle icon is set as a contact start position are listed.

A command instructing speed-up is issued by a gesture operation that touches a host vehicle icon and swipes the host vehicle icon in a forward direction in which there is no obstacle in the same lane as that of the host vehicle. A command instructing speed-down is issued by a gesture operation that swipes the host vehicle icon in a rear direction in which there is no obstacle. In this case, there is no need to prepare a user interface separately, and it is possible to save a space. A command instructing right align or left align in the same traffic lane as that of the host vehicle is issued by a gesture operation that touches a host vehicle icon and swipes the host vehicle icon in a right direction or in a left direction. In this case, it is possible to realize an operation input and a result display on the same screen, thereby saving a space.

A command for instructing the host vehicle to travel following a nearby vehicle or starting of adaptive cruise control (ACC) is issued by a gesture operation that drags and drops the host vehicle icon onto the nearby vehicle icon. A command instructing passing is issued by a gesture operation that drags and drops a host vehicle icon in front of the preceding a nearby vehicle icon. In this case, there is no need to prepare a user interface separately, and it is possible to save a space.

In a case where there are multiple lanes, a command instructing traffic lane change to another lane is issued by a gesture operation that drags and drops a host vehicle icon onto another lane. In this case, it is possible to realize an operation input and a result display on the same screen, thereby saving a space. In a case where there is a nearby vehicle in another lane, whether the host vehicle enters in front of the nearby vehicle or whether the host vehicle enters behind the nearby vehicle may be designated depending on whether the host vehicle icon is dropped in front of the nearby vehicle icon or whether the host vehicle icon is dropped behind the nearby vehicle icon. In a case where there is a right-turn-only lane and/or a left-turn-only lane, a command instructing right turn or left turn after lane change is issued by a gesture operation that drops a host vehicle icon onto a right-turn-only lane or a left-turn-only lane. In this case, it is possible to omit a step of inputting a right turn operation or a left turn operation.

A command instructing an entrance into a toll road is issued by a gesture operation that drags and drops a host vehicle icon onto an entrance icon of a toll road (for example, a highway). In this case, it is possible to omit a step of inputting what is to be performed for an entrance icon of a toll road. A command instructing an entrance into a toll road is issued by a gesture operation that drags and drops a host vehicle icon onto an entrance lane of a toll road. In this case, it is possible to realize an operation input and a result display on the same screen.

A command instructing an exit from a toll road is issued by a gesture operation that drags and drops a host vehicle icon onto an exit icon of a toll road. In this case, it is possible to omit a step of inputting what is to be performed for an exit icon of a toll road. A command instructing an exit from a toll road is issued by a gesture operation that drags and drops a host vehicle icon onto an exit lane of a toll road. In this case, it is possible to realize an operation input and a result display on the same screen.

In an acceleration lane at a junction point of a highway, after whether the host vehicle enters in front of the nearby vehicle or behind the nearby vehicle is determined according to a speed of a vehicle that is coming behind in a traveling lane, a command instructing junction control is issued, by a gesture operation that drags and drops the host vehicle icon onto a traveling lane. In this case, it is possible to realize an operation input and a result display on the same screen.

A command instructing course change is issued by a gesture operation that drags and drops a host vehicle icon onto a lane in a curved direction. In this case, it is possible to realize an operation input and a result display on the same screen. For example, when a host vehicle icon is dropped onto a right turn lane, a command instructing right turn is issued. A command instructing a U-turn is issued by a gesture operation that drags and drops a host vehicle icon so as to draw a character of U. In this case, it is possible to realize an operation input and a result display on the same screen.

A command instructing a destination change or a passing spot addition is issued by a gesture operation that drags and drags a host vehicle icon onto an icon indicating a destination or a landmark. An icon indicating home may be always displayed on the screen. A command instructing traveling toward a direction in which a host vehicle icon is flicked without a destination setting is issued by a gesture operation that touches the host vehicle icon and flicks the host vehicle icon in a desired direction to travel.

In a parking lot, when a driver drags and drops a host vehicle icon onto a desired block to park and drag the vehicle icon (the block is defined within a rough range such as the vicinity of an entrance of a store, or the like), a command instructing parking in a parking space that is empty in the block is issued.

When a driver drags and drops a host vehicle icon onto a pedestrian icon, a post icon, a bus stop icon, or a taxi stand icon, a command that instructs the host vehicle to be pulled over at a location at which the host vehicle icon is dropped is issued. In this case, it is possible to reduce a step of instructing a stop.

A point of interest (POI) range may be designated by a drag operation. For example, after a search range is designated, it is possible to search for a gas station within the range. A command instructing searching for a parking lot may be issued by a gesture operation that drags and drops a host vehicle icon onto a service area icon or a parking area icon.

A command instructing illuminating a pedestrian using a front lamp is issued by a gesture operation that drags and drops a host vehicle icon onto a pedestrian icon. In this case, it is possible to reduce a step of an operation for lighting a front lamp. A command instructing honking a horn to a pedestrian may be issued by a gesture operation that drags and drops a host vehicle icon onto a pedestrian icon. At this time, a horn with directivity may be used according to a position of a pedestrian. In this case, it is possible to reduce a step of an operation for honking a horn.

During dragging of a host vehicle icon, at the time of dropping of a host vehicle icon, or during a period for which a host vehicle icon is dropped and processing according to a control command is established, a predicted trajectory is received from automatic driving controller 20, and the predicted trajectory may be drawn on display unit 31. In a case where processing according to a control command is disabled temporarily because the host vehicle is waiting for the light to change or in a traffic lane change disable section, image generation unit 12 performs a display such as "trying" until processing according to a control command is established, and may draw a predicted trajectory at a timing at which processing becomes executable. During dragging of a host vehicle icon, or during the period for which a host vehicle icon is dropped and processing according to a control command is established, image generation unit 12 may display an estimated required-time or a remaining required-time until the host vehicle icon is dropped and processing according to a control command is established. In a case where processing according to a control command is disabled temporarily, the control may be set in advance to be continued until the control is enabled or suspended and stopped. Since dragging is started accidentally or a cancel operation after dragging is required in some cases, a cancel drop region may be provided. After dragging of a host vehicle, when a driver drops the host vehicle icon onto a cancel drop region, issuing of a command can be cancelled.

In the above description, after a host vehicle icon is dropped, in a case where the types of candidates of executable actions are two or more, a selection menu may be displayed after dropping. When a host vehicle icon is dragged, guidance of all available operations may be displayed on the screen. After a host vehicle icon is dragged, even though dragging of the host vehicle icon is released, a dragged state may be maintained until a confirmation button is pressed. After a host vehicle icon is dragged, in a case where the host vehicle icon is dropped accidentally, a correction method and a check method may be presented in a pop-up screen. The touch panel may be designed such that haptic feedback is applied in different vibration modes for a case where a host vehicle icon is moved to a drop enable position after the host vehicle icon is dragged and a case where the host vehicle icon is moved to a drop disable position after the host vehicle icon is dragged. When a host vehicle icon is dropped, a scale of the screen may be automatically adjusted. For example, a scale of the screen may be automatically adjusted such that at least the closest a nearby vehicle to the host vehicle is included in the screen. Accordingly, it is possible to easily find a nearby vehicle, and more quickly issue an instruction command. The color of a host vehicle icon may be changed in a case where the host vehicle icon is moved to a drop enable position after the host vehicle icon is dragged and a case where the host vehicle icon is moved to a drop disable position after the host vehicle icon is dragged. When a host vehicle icon is dragged, the color of the background may be different in a drop enable area and a drop disable area. Although a gesture operation corresponding to a control command is described as a drag-and-drop operation or the like, a touch- and touch operation may be used. A predetermined operation is preferably used, but an operation that is customizable by a driver may be used. Further, in order to recognize the corresponding relationship of a gesture operation and a control command, a comment, an icon, or an arrow may be displayed, or guide display or voice guidance may be provided, by display unit.

The embodiments may be specified by the following items.

[Item 1]

A driving support device (10) including:

an image output unit (14a) that outputs an image including a host vehicle object representing a host vehicle and a peripheral situation of the host vehicle, to a display unit (31);

an operation signal input unit (14b) that receives a gesture operation by a user that involves moving the host vehicle object in the image displayed on the display unit (31); and a command output unit (14c) that outputs a command corresponding to the gesture operation, to an automatic driving control unit (20) that controls automatic driving.

In this case, it is possible to intuitively and conveniently perform an operation related to automatic driving.

[Item 2]

The driving support device (10) according to Item 1, in which, when the operation signal input unit (14b) receives a user's gesture operation for moving the host vehicle object in the image displayed on the display unit (31) to the position of a non-host vehicle object representing a predetermined target other than the host vehicle, the command output unit (14c) outputs a command for instructing the change of the relative positional relationship between the host vehicle and the predetermined target, or a command for instructing the output of a notice from the host vehicle to the predetermined target, to the automatic driving control unit (20).

The predetermined target other than the host vehicle may be a nearby vehicle, a pedestrian, an obstacle, or a specific area.

In this case, it is possible to intuitively and conveniently perform an operation associated with the predetermined target other than the host vehicle.

[Item 3]

The driving support device (10) according to Item 1, in which, when the operation signal input unit (14b) receives a user's gesture operation for moving the host vehicle object in the image displayed on the display unit (31) to a position at which a non-host vehicle object representing a predetermined target other than the host vehicle is not present, the command output unit (14c) outputs a command for instructing moving of the host vehicle to a place corresponding to the end position of the gesture operation, to the automatic driving control unit (20).

In this case, it is possible to intuitively and conveniently perform an operation that is not associated with the predetermined target other than the host vehicle (for example, traffic lane change, course change, or the like).

[Item 4]

The driving support device (10) according to Item 1, in which, when the operation signal input unit (14b) receives a user's gesture operation for changing a distance between the host vehicle object in the image displayed on the display unit (31) and a non-host vehicle object representing a predetermined target other than the host vehicle, the command output unit (14c) outputs a command for instructing the change of the distance between the host vehicle and the predetermined target, to the automatic driving control unit (20).

In this case, it is possible to intuitively and conveniently perform an operation for changing the distance between the host vehicle and the predetermined target.

[Item 5]

The driving support device (10) according to Item 1, in which, when the operation signal input unit (14b) receives a user's gesture operation for interchanging the host vehicle object in the image displayed on the display unit (31) and a non-host vehicle object representing a predetermined target other than the host vehicle in the image, the command output unit (14c) outputs a command for instructing the change of the relative positional relationship between the host vehicle and the predetermined target, to the automatic driving control unit (20).

In this case, it is possible to intuitively and conveniently perform an operation for changing the relative positional relationship between the host vehicle and the predetermined target.

[Item 6]

The driving support device (10) according to Item 1, in which, in a state where the host vehicle and the predetermined target other than the host vehicle operate in a link state, when the operation signal input unit (14b) receives a user's gesture operation for moving the host vehicle object in the image displayed on the display unit to the outside of an imaginary line that connects the host vehicle object and a non-host vehicle object representing the predetermined target other than the host vehicle, the command output unit (14c) outputs a command for instructing the release of the link, to the automatic driving control unit.

In this case, it is possible to intuitively and conveniently perform an operation for releasing the link between the host vehicle and the predetermined target.

[Item 7]

The driving support device (10) according to Item 1, in which, the command output unit (14c) changes the content of the command to be output to the automatic driving control unit (20) according to the peripheral situation of the host vehicle when the operation signal input unit (14b) receives a gesture operation.

In this case, it is possible to issue a command according to the context.

[Item 8]

The driving support device (10) according to any one of Items 1 to 7, in which, during the period for which the operation signal input unit (14b) cannot receive a gesture operation of a user, the image output unit (14a) outputs an image in which a display mode of the host vehicle object is different from the display mode during the period for which the operation signal input unit can receive the gesture operation of the user, to the display unit (31).

In this case, a user can easily recognize whether the input of the gesture operation is valid or invalid in the period.

[Item 9]

The driving support device (10) according to any one of Items 1 to 8, in which, the image output unit (14a) changes sizes of the host vehicle object, the non-host vehicle object representing the predetermined target, and the peripheral situation of the host vehicle such that an image including the predetermined target other than the host vehicle is displayed on the display unit (31).

In this case, a user can view the image including the non-host vehicle object.

[Item 10]

A driving support system (10, 30) including:

a display device (30) that displays an image; and a driving support device (10) that outputs an image to the display device (30), in which the driving support device (10) includes:

an image output unit (14a) that outputs an image including a host vehicle object representing a host vehicle and a peripheral situation of the host vehicle, to the display device (30);

an operation signal input unit (14b) that receives a gesture operation by a user that involves moving of the host vehicle object in the image displayed on the display device (30); and a command output unit (14c) that outputs a command according to the gesture operation, to an automatic driving control unit (20) that controls automatic driving.

In this case, it is possible to intuitively and conveniently perform an operation related to automatic driving.

[Item 11]

A driving support method including:

a step of outputting an image including a host vehicle object representing a host vehicle and a peripheral situation of the host vehicle, to a display unit (31);

a step of receiving a gesture operation by a user that involves moving of the host vehicle object in the image displayed on the display unit (31); and a step of outputting a command according to the gesture operation, to an automatic driving control unit (20) that controls automatic driving.

In this case, it is possible to intuitively and conveniently perform an operation related to automatic driving.

[Item 12]

A driving support program causing a computer to execute:

processing of outputting an image including a host vehicle object representing a host vehicle and a peripheral situation of the host vehicle, to a display unit (31);

processing of receiving a gesture operation by a user that involves moving of the host vehicle object in the image displayed on the display unit (31); and processing of outputting a command according to the gesture operation, to an automatic driving control unit (20) that controls automatic driving.

In this case, it is possible to intuitively and conveniently perform an operation related to automatic driving.

[Item 13]

An automatic drive vehicle (1) including:

an image output unit (14a) that outputs an image including a host vehicle object representing a host vehicle and a peripheral situation of the host vehicle, to a display unit (31);

an operation signal input unit (14b) that receives a gesture operation by a user that involves moving the host vehicle object in the image displayed on the display unit (31);

a command output unit (14c) that outputs a command according to the gesture operation; and an automatic driving control unit (20) that executes the output command.

In this case, it is possible to intuitively and conveniently perform an operation related to automatic driving.

INDUSTRIAL APPLICABILITY

The present invention can be used in a vehicle equipped with automatic driving mode.

REFERENCE MARKS IN THE DRAWINGS

1 Vehicle
10 Driving support device (HMI controller)
11 Determination unit
11a Automatic driving control command table
12 Image generation unit
13 Instruction unit
14 Input-output unit
14a Image output unit
14b Operation signal input unit
14c Command output unit
14d Vehicle information input unit
20 Automatic driving control device (Automatic driving controller)
21 Control unit
22 Memory unit
23 Input-output unit
30 Display device
31 Display unit
32 Input unit
40 Detection unit
41 Position information acquisition unit
42 Sensor
43 Speed information acquisition unit
44 Map information acquisition unit
50 Driving operation unit
51 Steering
52 Brake pedal
53 Accelerator pedal
54 Blinker switch

The invention claimed is:

1. A driving support device which is configured to be coupled to a vehicle, the driving support device comprising:
an image output unit which, in operation, outputs an image including a first vehicle object representing the vehicle and a peripheral situation of the vehicle, to a display device;
an operation signal input unit which, in operation, receives a signal indicating a gesture operation for moving, in the image displayed by the display device, the first vehicle object closer to or farther apart from a second vehicle object representing another vehicle while the first vehicle object and the second vehicle object are selected, the gesture operation changing a distance between the first vehicle object and the second vehicle object in the image displayed by the display device; and
a command output unit which, in operation, outputs a command that instructs an automatic driving control device which, in operation, controls automatic driving of the vehicle, the command instructing the automatic driving control device to change a distance between the vehicle and the other vehicle in a case that the vehicle and the other vehicle are driving in an identical driving lane when the signal indicating the gesture operation is received,
wherein the distance after the change is determined according to the distance between the first vehicle object and the second vehicle object.

2. The driving support device of claim 1,
wherein, during a period in which the operation signal input unit is disabled from receiving the signal indicating the gesture operation, the image output unit outputs, to the display device, an image in which a display mode of the first vehicle object is different from a display mode during a period in which the operation signal input unit is enabled to receive the signal indicating the gesture operation.

3. The driving support device of claim 1,
wherein the image output unit changes sizes of the first vehicle object, a target object representing a target other than the vehicle, and the peripheral situation of the vehicle such that an image including the target other than the vehicle is displayed by the display device.

4. The driving support device of claim 1,
wherein the distance after the change is determined according to a distance between the first vehicle object and the second vehicle object when the signal indicating the gesture operation is received, the distance between the first vehicle object and the second vehicle object being determined according to the gesture operation.

5. The driving support device of claim 1,
wherein the distance after the change is determined according to a change in a first touch position on the first vehicle object before the gesture operation is performed and a second touch position on the first vehicle object after the gesture operation is performed, and a change in a third touch position on the second vehicle object before the gesture operation is performed and a fourth touch position on the second vehicle object after the gesture operation is performed.

6. The driving support device of claim 1,
wherein the command further instructs the automatic driving control device to change a speed of the vehicle, an amount of the change of the speed of the vehicle being determined according to the signal indicating the gesture operation received by the operation signal input unit.

7. A driving support method comprising:
outputting an image including a first vehicle object representing a vehicle and a peripheral situation of the vehicle, to a display device;
receiving a signal indicating a gesture operation for moving, in the image displayed by the display device, the first vehicle object closer to or farther part from a second vehicle object representing another vehicle while the first vehicle object and the second vehicle object are selected;
changing a distance between the first vehicle object and the second vehicle object in the image displayed by the display device based on the gesture operation; and
outputting a command that causes an automatic driving control device that controls automatic driving of to vehicle to change distance between the vehicle and the other vehicle in a case that the vehicle and the other vehicle are driving in an identical driving lane when the signal indicating the gesture operation is received,
wherein the distance between the vehicle and the other vehicle after the change is determined according to the distance between the first vehicle object and the second vehicle object.

8. The driving support method of claim 7,
wherein, during a period in which the receiving of the signal indicating the gesture operation is disabled, outputting, to the display device, an image in which a display mode of the first vehicle object is different from a display mode during a period in which the receiving of the signal indicating the gesture operation is enabled.

9. The driving support method of claim 7,
changing sizes of the first vehicle object, a target object representing a target other than the vehicle, and the peripheral situation of the vehicle such that an image including the target object representing the target other than the vehicle is displayed by the display device.

10. The driving support method of claim 7,
wherein the distance after the change is determined according to a distance between the first vehicle object and the second vehicle object when the signal indicating the gesture operation is received, the distance between the first vehicle object and the second vehicle object being determined according to the gesture operation.

11. The driving support method of claim 7,
wherein the distance after the change is determined according to a change in a first touch position on the first vehicle object before the gesture operation is performed and a second touch position on the first vehicle object after the gesture operation is performed, and a change in a third touch position on the second vehicle object before the gesture operation is performed and a fourth touch position on the second vehicle object after the gesture operation is performed.

12. The driving support method of claim 7,
wherein the command further instructs the automatic driving control device to change a speed of the vehicle,
an amount of the change of the speed of the vehicle being determined according to the signal indicating the gesture operation being received by the operation signal input unit.

13. A driving support system which is configured to be coupled to a vehicle, the driving support system comprising:
a display device which, in operation, displays an image; and
a driving support device which, in operation, outputs an image to the display device,
wherein the driving support device includes:
an image output unit which, in operation, outputs an image including a first vehicle object representing the vehicle and a peripheral situation of the vehicle, to the display device;
an operation signal input unit which, in operation, receives a signal indicating a gesture operation for moving, in the image displayed by the display device, the first vehicle object closer to or farther apart from a second vehicle other representing another vehicle while the first vehicle object and the second vehicle object are selected the gesture operation changing a distance between the first vehicle object and the second vehicle object in the image displayed by the display device; and
a command output unit which, in operation, outputs a command that instructs an automatic driving control device which, in operation, controls automatic driving of the vehicle, the command instructing the automatic driving control device to change a distance between the vehicle and the other vehicle in a case that the vehicle and the other vehicle are driving in an identical driving lane,
wherein the distance after the change is determined according to the distance between the first vehicle object and the second vehicle object.

14. The driving support system of claim 13,
wherein, during a period in which the operation signal input unit is disabled from receiving the signal indicating the gesture operation, the image output unit outputs, to the display device, an image in which a display mode of the first vehicle object is different from a display mode during a period in which the operation signal input unit is enabled to receive the signal indicating the gesture operation.

15. The driving support system of claim 13,
wherein the image output unit changes sizes of the first vehicle object, a target object representing a target other than the vehicle, and the peripheral situation of the vehicle such that an image including the target object representing the target other than the vehicle is displayed by the display device.

16. The driving support system of claim 13,
wherein the distance after the change is determined according to a distance between the first vehicle object and the second vehicle object when the signal indicating the gesture operation is received, the distance between the first vehicle object and the second vehicle object being determined according to the gesture operation.

17. The driving support system of claim 13,
wherein the distance after the change is determined according to a change in a first touch position on the first vehicle object before the gesture operation is performed and a second touch position on the first vehicle object after the gesture operation is performed, and a change in a third touch position on the second vehicle object before the gesture operation is performed and a fourth touch position on the second vehicle object after the gesture operation is performed.

18. The driving support system of claim 13,
wherein the command further instructs the automatic driving control device to change a speed of the vehicle,
an amount of the change of the speed of the vehicle being determined according to the signal indicating the gesture operation received by the operation signal input unit.

* * * * *